United States Patent
Nasu et al.

(12)

(10) Patent No.: US 11,442,433 B2
(45) Date of Patent: Sep. 13, 2022

(54) MANAGEMENT DEVICE, MANAGEMENT SYSTEM, MANAGEMENT METHOD, AND PROGRAM FOR PROVIDING VIRTUAL AND REAL RESOURCE INFORMATION VALUES

(71) Applicant: Mitsubishi Electric Corporation, Tokyo (JP)

(72) Inventors: Osamu Nasu, Tokyo (JP); Kohei Kato, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/417,391

(22) PCT Filed: Feb. 14, 2019

(86) PCT No.: PCT/JP2019/005429
§ 371 (c)(1),
(2) Date: Jun. 23, 2021

(87) PCT Pub. No.: WO2020/166026
PCT Pub. Date: Aug. 20, 2020

(65) Prior Publication Data
US 2022/0043429 A1 Feb. 10, 2022

(51) Int. Cl.
*G05B 19/418* (2006.01)
*G06F 9/50* (2006.01)

(52) U.S. Cl.
CPC ..... *G05B 19/4185* (2013.01); *G05B 19/4183* (2013.01); *G05B 19/4188* (2013.01); *G06F 9/505* (2013.01); *G06F 9/5044* (2013.01)

(58) Field of Classification Search
None
See application file for complete search history.

(56) References Cited

U.S. PATENT DOCUMENTS

2007/0203676 A1 8/2007 Jinzenji et al.
2018/0003543 A1* 1/2018 Ito .......................... G01G 19/00
(Continued)

FOREIGN PATENT DOCUMENTS

CN 105493050 A 4/2016
JP 2004-272315 A 9/2004
(Continued)

OTHER PUBLICATIONS

International Search Report and Written Opinion dated Apr. 23, 2019, received for PCT Application PCT/JP2019/005429, Filed on Feb. 14, 2019, 10 pages including English Translation.
(Continued)

*Primary Examiner* — Eric C Wai
(74) *Attorney, Agent, or Firm* — Xsensus LLP

(57) ABSTRACT

A receiver (131) receives an acquisition request to acquire a value of real resource information associated with a device (20) connected to a network or a value of virtual resource information associated with a calculation result of calculation performed using a value of the real resource information. A real resource information acquirer (1352) acquires the value of the real resource information by causing a collector (140) to collect a value from the device (20) associated with the real resource information. A virtual resource information acquirer (1353) acquires the value of the virtual resource information by causing a calculator (1354) to perform calculation using the value of the real resource information. A responder (136) returns a response including the value of the real resource information or a response including the value of the virtual resource information based on the received acquisition request.

20 Claims, 15 Drawing Sheets

(56) References Cited

U.S. PATENT DOCUMENTS

2019/0025807 A1　1/2019　Kobuchi et al.
2019/0287488 A1　9/2019　Yanagihara

FOREIGN PATENT DOCUMENTS

| JP | 2005-352704 A | 12/2005 |
| JP | 2007-249936 A | 9/2007 |
| JP | 2010-257097 A | 11/2010 |
| JP | 2010-267048 A | 11/2010 |
| JP | 2017-156798 A | 9/2017 |
| JP | 2019-21048 A | 2/2019 |
| WO | 2015/029969 A1 | 3/2015 |
| WO | 2018/096694 A1 | 5/2018 |

OTHER PUBLICATIONS

Notice of Reasons for Refusal dated Jun. 2, 2020, received for JP Application 2020-519460, 12 pages including English Translation.
Decision to Grant dated Oct. 13, 2020, received for JP Application 2020-519460, 5 pages including English Translation.
Chinese Office Action dated Jan. 14, 2022, issued for corresponding Chinese Application No. 201980091582.X.

\* cited by examiner

FIG. 6

| | | SYSTEM CONFIGURATION INFORMATION 1341 | | | |
|---|---|---|---|---|---|
| ID | NODE NAME | PARENT NODE ID | MANAGEMENT DEVICE ID | RETRIEVABILITY INFORMATION | CHANGEABILITY INFORMATION |
| 1 | LINE-X | - | 11 | POSSIBLE | POSSIBLE |
| 2 | DEVICE [21] | 1 | 11 | POSSIBLE | POSSIBLE |
| 3 | DEVICE [22] | 1 | 12 | POSSIBLE | POSSIBLE |
| 4 | DEVICE [23] | 1 | 13 | POSSIBLE | IMPOSSIBLE |
| 5 | DEVICE [24] | 4 | 13 | POSSIBLE | IMPOSSIBLE |
| 6 | DEVICE [25] | 4 | 13 | IMPOSSIBLE | IMPOSSIBLE |
| 7 | DEVICE [26] | 4 | 13 | IMPOSSIBLE | IMPOSSIBLE |

FIG. 7

DEVICE INFORMATION 1342

| ID | NODE NAME | TYPE | PARENT NODE ID | SYSTEM CONFIGURATION INFORMATION ID | DETAILED INFORMATION |
|---|---|---|---|---|---|
| 1 | DEVICE [22] | GROUP | - | - | - |
| 2 | SENSORS | GROUP | 1 | - | - |
| 3 | MOTORS | GROUP | 1 | 3 | - |
| 4 | FIRST TEMPERATURE SENSOR | REAL RESOURCE | 2 | 3 | D0 |
| 5 | FIRST PRESSURE SENSOR | REAL RESOURCE | 2 | 3 | D1 |
| 6 | SECOND TEMPERATURE SENSOR | REAL RESOURCE | 2 | 3 | D2 |
| 7 | SECOND PRESSURE SENSOR | REAL RESOURCE | 2 | 3 | D3 |
| 8 | FIRST SHAFT | REAL RESOURCE | 3 | 3 | X1 |
| 9 | SECOND SHAFT | REAL RESOURCE | 3 | 3 | X2 |
| 10 | DEVICE MANUAL | FILE | 1 | 3 | c:/doc/Manual.pdf |
| 11 | MAINTENANCE HISTORY | FILE | 1 | 3 | c:/doc/Mentenance.xlsx |
| 12 | VIRTUAL RESOURCE INFORMATION | GROUP | - | - | - |
| 13 | AVERAGE TEMPERATURE | VIRTUAL RESOURCE | 12 | - | (NODE ID [4] + NODE ID [6])/2 |
| 14 | ALL SHAFTS OPERATION STATE | VIRTUAL RESOURCE | 12 | - | NODE ID [8] & NODE ID [9] |

FIG. 8

| CONNECTION INFORMATION 1343 | | | |
|---|---|---|---|
| ID | MANAGEMENT DEVICE ID | CONNECTION STATE | DEVICE CONNECTION INFORMATION |
| 1 | 11 | ON-LINE | POSSIBLE |
| 2 | 12 | ON-LINE | POSSIBLE |
| 3 | 13 | OFF-LINE | DEVICE 26 |

FIG. 9

| DEVICE NAME | RESOURCE INFORMATION NAME | VALUE | TIME STAMP | I/O ADDRESS OR ARITHMETIC EXPRESSION |
|---|---|---|---|---|
| DEVICE [22] | FIRST TEMPERATURE SENSOR | 24 | 2018/9/19 13:50:00 | D0 |
| DEVICE [22] | AVERAGE TEMPERATURE | 25 | 2018/9/19 13:50:00 | (DEVICE [22]. FIRST TEMPERATURE SENSOR + DEVICE [22]. SECOND TEMPERATURE SENSOR)/2 |
| DEVICE [22] | FIRST PRESSURE SENSOR | 44 | 2018/9/19 13:51:00 | D1 |
| DEVICE [22] | ALL SHAFTS OPERATION STATE | 100 | 2018/9/19 13:51:30 | DEVICE [22]. FIRST SHAFT & DEVICE [22]. SECOND SHAFT |
| DEVICE [26] | TEMPERATURE SENSOR | 22 | 2018/9/19 13:52:00 | D10 |
| FACTORY A | AVERAGE TEMPERATURE | 23 | 2018/9/19 13:55:00 | (DEVICE [22]. FIRST TEMPERATURE SENSOR + DEVICE [22]. SECOND TEMPERATURE SENSOR + DEVICE [26]. TEMPERATURE SENSOR)/3 |
| : | : | : | : | : |

FIG. 12

| | RESOURCE INFORMATION 1344 | | | |
|---|---|---|---|---|
| ID | RESOURCE INFORMATION NAME | TYPE | VALUE | TIME STAMP |
| 1 | FIRST TEMPERATURE SENSOR | REAL RESOURCE | 22 | 2018/9/19 13:50:00 |
| 2 | FIRST PRESSURE SENSOR | REAL RESOURCE | 40 | 2018/9/19 13:50:00 |
| 3 | SECOND TEMPERATURE SENSOR | REAL RESOURCE | 25 | 2018/9/19 13:50:00 |
| 4 | SECOND PRESSURE SENSOR | REAL RESOURCE | 48 | 2018/9/19 13:50:00 |
| 5 | FIRST SHAFT | REAL RESOURCE | 200 | 2018/9/19 13:50:00 |
| 6 | SECOND SHAFT | REAL RESOURCE | 100 | 2018/9/19 13:50:00 |
| 7 | AVERAGE TEMPERATURE | VIRTUAL RESOURCE | 24 | 2018/9/19 13:50:00 |
| 8 | ALL SHAFTS OPERATION STATE | VIRTUAL RESOURCE | 200 | 2018/9/19 13:50:00 |

MANAGEMENT DEVICE, MANAGEMENT SYSTEM, MANAGEMENT METHOD, AND PROGRAM FOR PROVIDING VIRTUAL AND REAL RESOURCE INFORMATION VALUES

CROSS-REFERENCE TO RELATED APPLICATION

The present application is based on PCT filing PCT/JP2019/005429, filed Feb. 14, 2019, the entire contents of which are incorporated herein by reference.

TECHNICAL FIELD

The present disclosure relates to a management device, a management system, a management method, and a program.

BACKGROUND ART

Multiple devices in a facility such as a factory are connected to a network and managed. A management device that manages these devices and terminal devices that can communicate with the management device include an application for displaying information about the devices in the facility. In response to a user's request for a value such as the yield or the production amount through this application, the management device typically acquires a value through the network from a device forming a distributed control system (DCS) or a device such as a programmable logic controller (PLC), and calculates the requested value through processing based on the acquired value in the application.

For example, Patent Literature 1 describes a technique used in a production management system for calculating the output for each predetermined cycle based on event data indicating the processes and trend data indicating time-series data measured by the devices and providing the output to the user.

CITATION LIST

Patent Literature

Patent Literature 1: Unexamined Japanese Patent Application Publication No. 2005-352704

Summary of Invention

Technical Problem

To acquire a calculation result based on a value acquired from a device with a known method, a management device for managing the device collects the value from the device through a network, and returns the collected value to an application in the requester device, and the application performs calculation based on the returned value. When many values are to be used to acquire a calculation result processing of returning to the application as many values as the values for acquisition of the calculation result is to be performed in such a known method. However, if only the calculation result can be returned to the application, such processing of returning many values can be eliminated.

An objective of the present disclosure is to provide a management device, a management system, a management method, and a program for collecting values from devices managed through a network, and providing a result of calculation based on the collected values in response to a request.

Solution to Problem

To achieve the above objective, a management device according to an aspect of the present disclosure is a device for managing a data model including real resource information associated with a device connected to a network, and virtual resource information associated with a calculation result of calculation performed using a value of the real resource information. The management device includes a receiver to receive an acquisition request generated based on the data model to acquire the value of the real resource information or a value of the virtual resource information, a calculator to perform the calculation, a real resource information acquirer to acquire the value of the real resource information by causing a collector to collect a value from the device associated with the real resource information, a virtual resource information acquirer to acquire the value of the virtual resource information by causing calculator to perform the calculation using the value of the real resource information, and a responder to return, in response to the receiver receiving the acquisition request for the real resource information, a response including the value of the real resource information acquired by the real resource information acquirer to acquire to a requester of the acquisition request, and returning, in response to the receiver receiving the acquisition request for the virtual resource information, a response including the value of the virtual resource information acquired by the virtual resource information acquirer to a requester of the acquisition request, when the calculation uses the values of multiple pieces of the real resource information and the time points at which the values are collected, by the collector, from the devices associated with the multiple pieces of the real resource information fail to match, the real resource information acquirer causes the collector to collect the values again from the devices associated with the multiple pieces of the real resource information.

Advantageous Effects of Invention

The above aspect of the present disclosure can receive an acquisition request for the value of real resource information associated with a device, and return the requested value to a requester. The above aspect of the present disclosure can also receive an acquisition request for the value of virtual resource information associated with a calculation result using the value of real resource information, and return the requested value to a requester. In response to an acquisition request for the value of virtual resource information, the above aspect of the present disclosure returns the requested calculation result alone without returning values collected from the devices used for processing. Thus, the above aspect can eliminate unintended processing of returning unrequested values. When receiving a request from a terminal device other than a management device, the above aspect transmits the calculation result alone without returning the values collected from the devices, and thus can save traffic for returning the collected values. The management device collects values from devices to calculate the calculation result, and thus can reduce a time difference between values retrieved from multiple devices and improve the accuracy of the calculation result. The management device can keep the values collected from the devices within the management device, and thus improve security.

BRIEF DESCRIPTION OF DRAWINGS

FIG. 6 is a table illustrating system configuration information according to Embodiment 1;

FIG. 7 is a table illustrating device information according to Embodiment 1;

FIG. 8 is a table illustrating connection information according to Embodiment 1;

FIG. 9 is a table illustrating an example of a display screen according to Embodiment 1;

FIG. 12 is a table illustrating resource information according to Embodiment 2;

DESCRIPTION OF EMBODIMENTS

Embodiment 1

A management system 1 according to Embodiment 1 is a factory automation (FA) system installed at a factory, and corresponds to a production system that produces products. This management system 1 performs various processes, such as processing, monitoring, and inspections, on workpieces conveyed along a line X that is a production line at a factory A. The management system 1 enables a user U1 to manage the state of the system.

Figure 1:
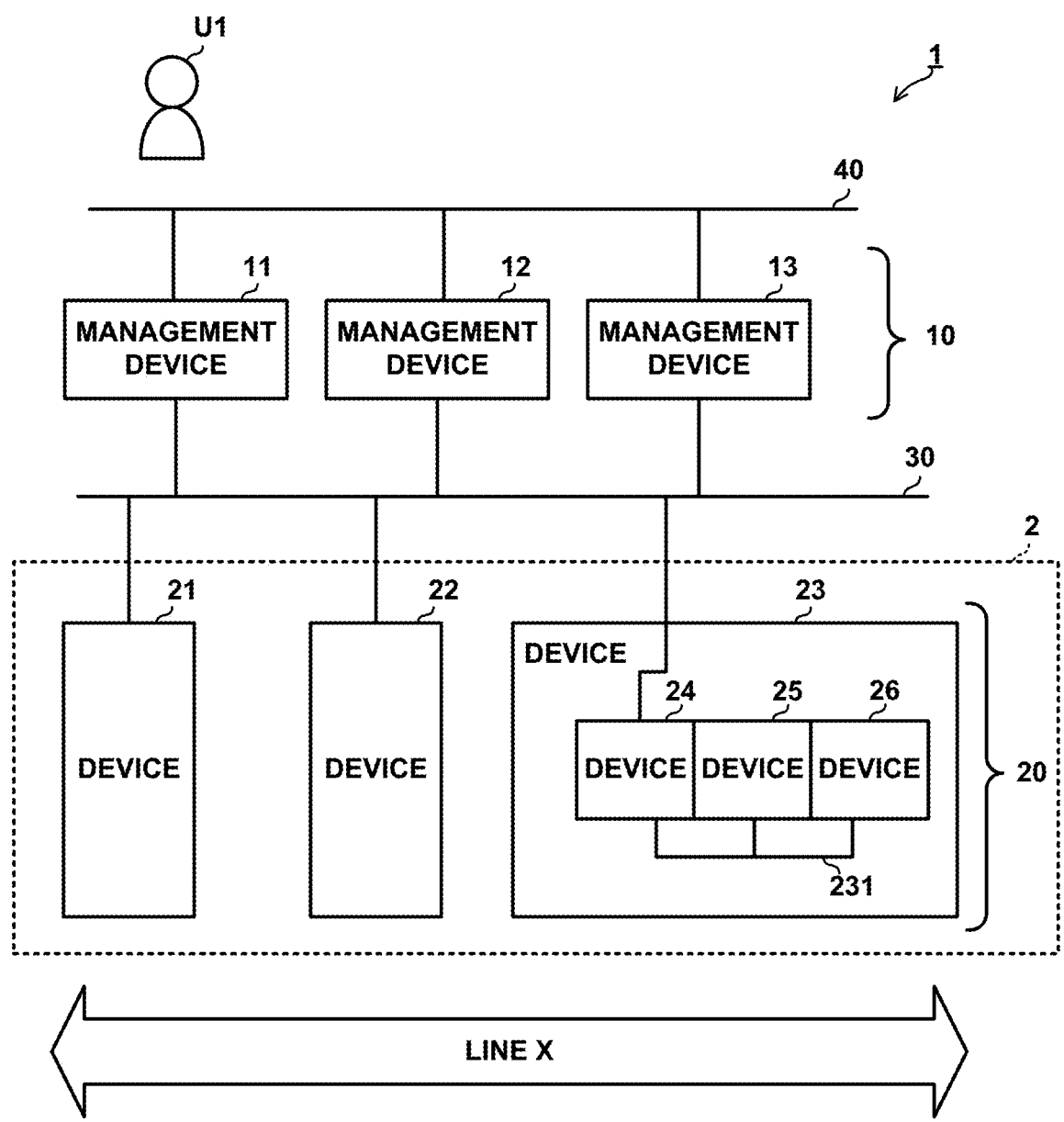
FIG. 1 is a block diagram illustrating a management system according to Embodiment 1 of the present disclosure.

With reference to FIG. 1, the structure of the management system 1 will be described. The management system 1 includes a device system 2, and management devices 11, 12, and 13 that manage devices included in the device system 2. The device system 2 includes devices 21, 22, and 23 and devices 24, 25, and 26 incorporated in the device 23. The devices 21, 22, 23, and 24 are connected to a network 30, and the devices 25 and 26 are connected to the device 24 with a bus 231. The management devices 11, 12, and 13 are connected to networks 30 and 40.

The management devices 11 to 13 manage the devices 21 to 26 included in the device system 2 by, for example, monitoring or operating the devices 21 to 26. In the management system 1, the management device 11 manages the device 21, the management device 12 manages the device 22, and the management device 13 manages the devices 23 to 26. Each of the management devices 11 to 13 performs, on devices other than devices to be managed by the management device through the other ones of the management devices 11 to 13, processing such as information collection, settings, and operations. For example, instead of directly accessing the device 22, the management device 11 performs processing on the device 22 through the management device 12.

Examples of the devices 21 to 26 include actuators, robots, PLC, and sensors.

The network 30 is an industrial network. The network 30 connects the management devices 11 to 13 and the devices 21 to 24 to each other to enable these devices to communicate with each other. The devices 25 and 26 are connected to the management devices 11 to 13 through the device 24 connected to the network 30 to communicate with the management devices 11 to 13. The network 40 is a wired or wireless communication network such as a local area network (LAN). The network 40 connects the management devices 11 to 13 with each other to enable these devices to communicate with each other.

The management devices 11 to 13 are hereafter collectively referred to as management devices 10. Similarly, the devices 21 to 26 are collectively referred to as devices 20.

Each of the management devices 10 includes an application that enables the user U1 to easily manage all the devices 20 by operating any of the management devices 10. The user U1 can manage the devices 20 with the application of each management device 10 without paying attention to which devices 20 are managed by the management device 10 used by the user U1.

For example, using the application, the user U1 can refer to the system configuration indicating the relationship between the devices 20 included in the device system 2.

Figure 2:
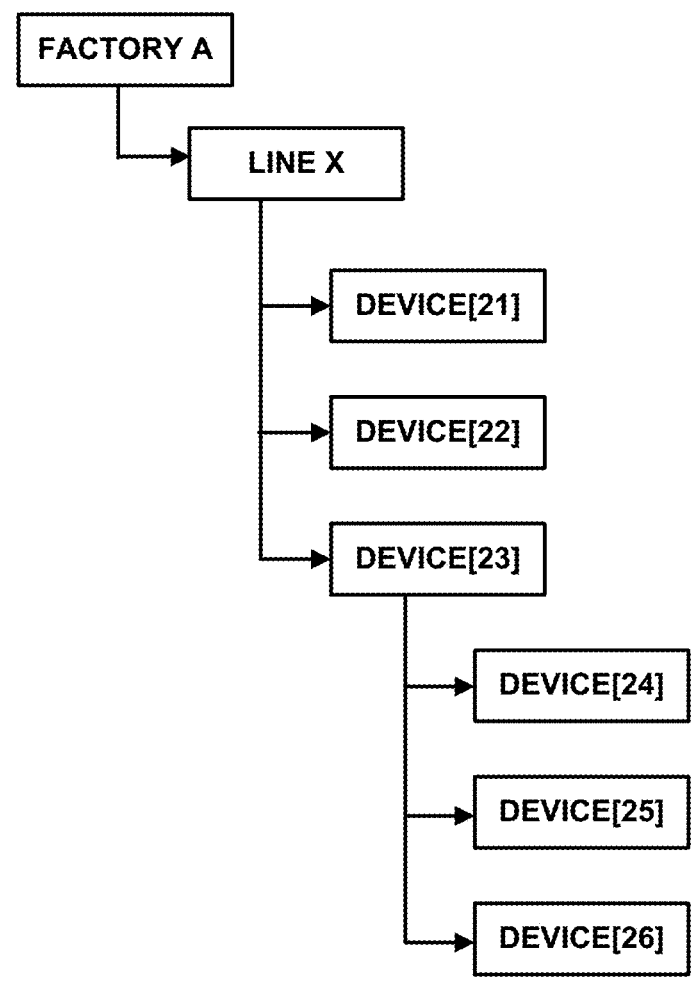
FIG. 2 is a diagram illustrating a tree structure of a system according to Embodiment 1.

FIG. 2 illustrates an example of a system configuration diagram illustrating the device system 2. The system configuration diagram illustrated in FIG. 2 indicates the physical connection relationship between the devices in the device system 2 shown in FIG. 1 with a master/slave relationship in a tree structure. In FIG. 2, the numerals following DEVICE correspond to the reference signs of the devices included in the device system 2. For example, DEVICE [21] corresponds to the device 21. The system configuration diagram illustrated in FIG. 2 indicates that the line X in the factory A includes the devices 21 to 26, and the devices 24 to 26 are subordinate to the device 23. The system configuration diagram illustrated in FIG. 2 defines the physical connection relationship between the devices in the device system 2 shown in FIG. 1. However, the system configuration diagram may be created as appropriate independently of the real physical connection relationship between the devices 20 and the managing area of each management device 10.

Figure 3:
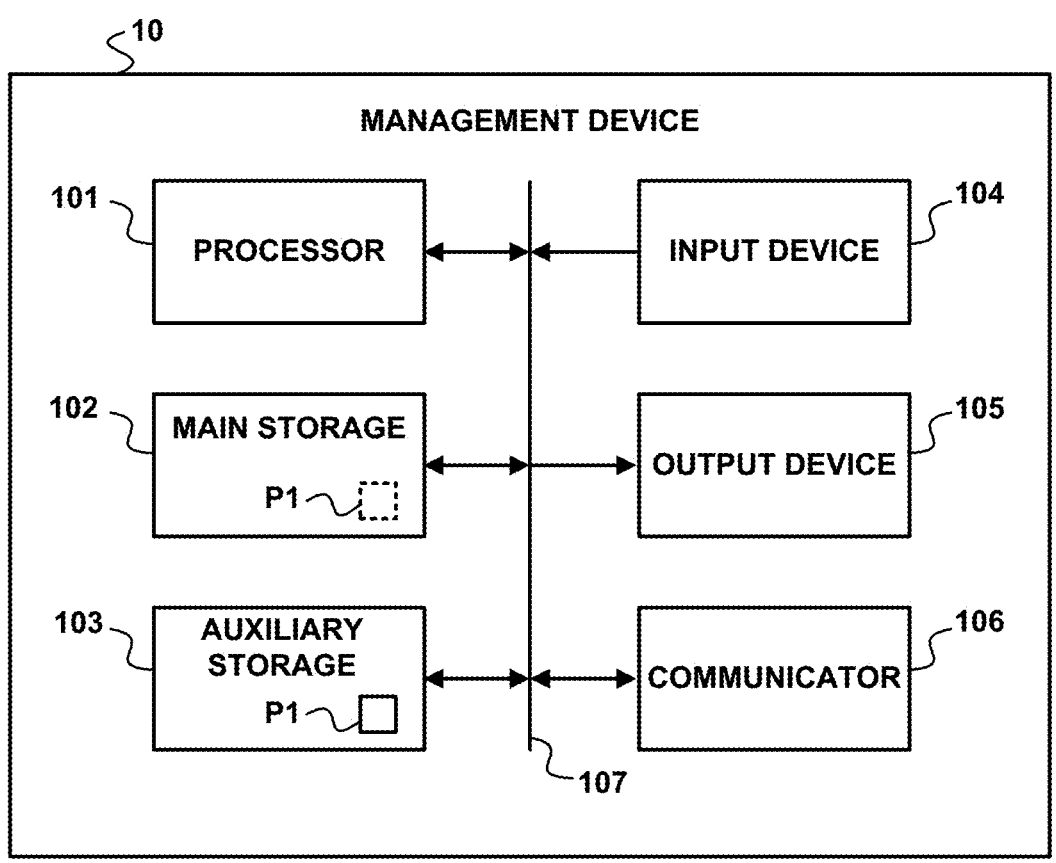
FIG. 3 is a diagram illustrating a management device according to Embodiment 1 showing the hardware structure.

Referring now to FIG. 3, the hardware structure of each management device 10 will be described. Each management device 10 includes a processor 101 that performs operations on management of the device 20, a main storage 102 used as a work area for the processor 101, an auxiliary storage 103 that stores various data sets used for the processing performed by the processor 101, an input device 104 that acquires information input by the user U1, an output device 105 that provides various information items to the user U1, and a communicator 106 that communicates with external devices. The main storage 102, the auxiliary storage 103, the input device 104, the output device 105, and the communicator 106 are connected to the processor 101 with an internal bus 107.

The processor 101 includes a micro-processing unit (MPU). The processor 101 executes a program P1 stored in the auxiliary storage 103 to implement various functions of the management device 10 and thus to perform the processes described later.

The main storage 102 includes a random-access memory (RAM). The program P1 is loaded from the auxiliary storage 103 into the main storage 102. The main storage 102 serves as a work area for the processor 101.

The auxiliary storage 103 includes a nonvolatile memory such as an electrically erasable programmable read-only memory (EEPROM). Besides the program P1, the auxiliary storage 103 stores various data sets used for the processing performed by the processor 101. In accordance with instructions from the processor 101, the auxiliary storage 103 provides data to be used by the processor 101 to the processor 101 and stores the data provided from the processor 101.

The input device 104 includes input devices such as input keys and pointing devices. The input device 104 acquires information input by the user U1 of the management device 10 and provides the acquired information to the processor 101.

The output device 105 includes output devices such as a liquid crystal display (LCD) and a speaker. The output device 105 may be a touch screen integrally formed with the pointing devices included in the input device 104. The output device 105 provides various information items to the user U1 in accordance with instructions from the processor 101.

The communicator 106 includes a network interface circuit for communicating with external devices. The communicator 106 receives external signals, and outputs data represented by the signals to the processor 101. The communicator 106 transmits signals representing data output from the processor 101 to external devices.

Each management device 10 implements various functions in cooperation with the above hardware components.

Each management device 10 has the management function that enables a user to form and edit a data model based on data acquired from the devices 20. A data model herein is formed appropriately by a user independently of the physical connection relationship based on any data acquirable from devices including data set to each device and data measured by each device. Thus, the user can show enormous data in the factory with a hierarchical structure and hierarchically manage the data. The management device 10 can easily manage the devices 20 with the function of managing the data model. The application uses the managed data model. The application can thus collectively access facility data in the factory, and the user can uniformly manage and maintain the production site using the application.

The data model according to the present embodiment includes real resource information associated with each device 20, virtual resource information associated with the calculation result of the calculation performed using the value of real resource information, and file resource information associated with a document.

The real resource information is associated with each device 20 by the user, and indicates, for example, information items set with the device 20, information items measured by the device 20, and items indicating the functions of the device 20.

The virtual resource information is associated with the calculation result of the calculation performed using the value of real resource information. The virtual resource information indicates, for example, items of the calculation.

The file resource information indicates items of a document such as a device manual and maintenance history. That is, the data model may include a document in addition to data acquired from the device.

The data model may also include items regarding the devices 20 that are not managed by the corresponding management device 10.

Figure 4:
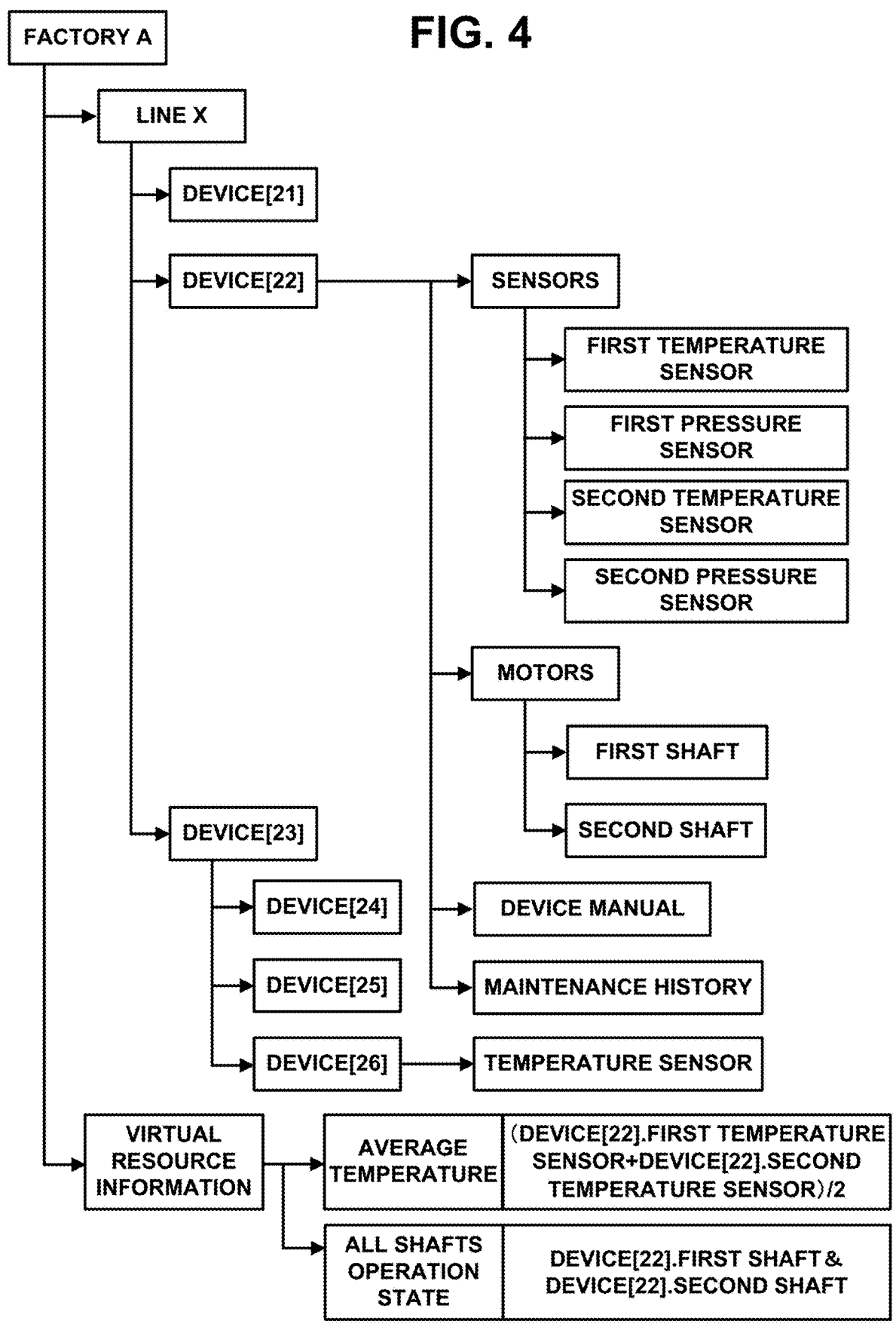
FIG. 4 is a diagram illustrating a data model according to Embodiment 1.

FIG. 4 shows an example of a data model. The data model illustrated in FIG. 4 is formed by the user U1 to show the configuration of the device system 2 in the factory A. The data model in FIG. 4 is created in the management device 12 that manages the device 22.

When, for example, the device 22 includes a first temperature sensor, a second temperature sensor, a first pressure sensor, a second pressure sensor, and a first shaft and a second shaft included in a motor, the user U1 can add items such as FIRST TEMPERATURE SENSOR and SECOND TEMPERATURE SENSOR included in the device 22 to the data model as illustrated in FIG. 4. An item such as AVERAGE TEMPERATURE in the calculation result acquired by using the added items may be added to the data model to define the calculation for acquiring the calculation result. As shown in FIG. 4, the user U1 can add an item TEMPERATURE SENSOR in the device 26 that is not managed by the management device 12. The user U1 can also add DEVICE MANUAL and MAINTENANCE HISTORY of the device 22. For example, when a node indicating the device 22 in the system configuration diagram illustrated in FIG. 2 is selected, the added item associated with the device 22 appears in a tree view as illustrated in FIG. 4.

In the data model in FIG. 4, FIRST TEMPERATURE SENSOR, SECOND TEMPERATURE SENSOR, FIRST PRESSURE SENSOR, SECOND PRESSURE SENSOR, and FIRST SHAFT and SECOND SHAFT of a motor correspond to the real resource information, and AVERAGE TEMPERATURE and ALL SHAFTS OPERATION STATE correspond to the virtual resource information.

The user U1 can request values regarding the items included in the data model. The user U1 can easily understand the configuration of the device system 2 through the data model, and can easily acquire values acquirable from the devices 20 in the device system 2 without paying attention to the range managed by each management device 10.

Figure 5:
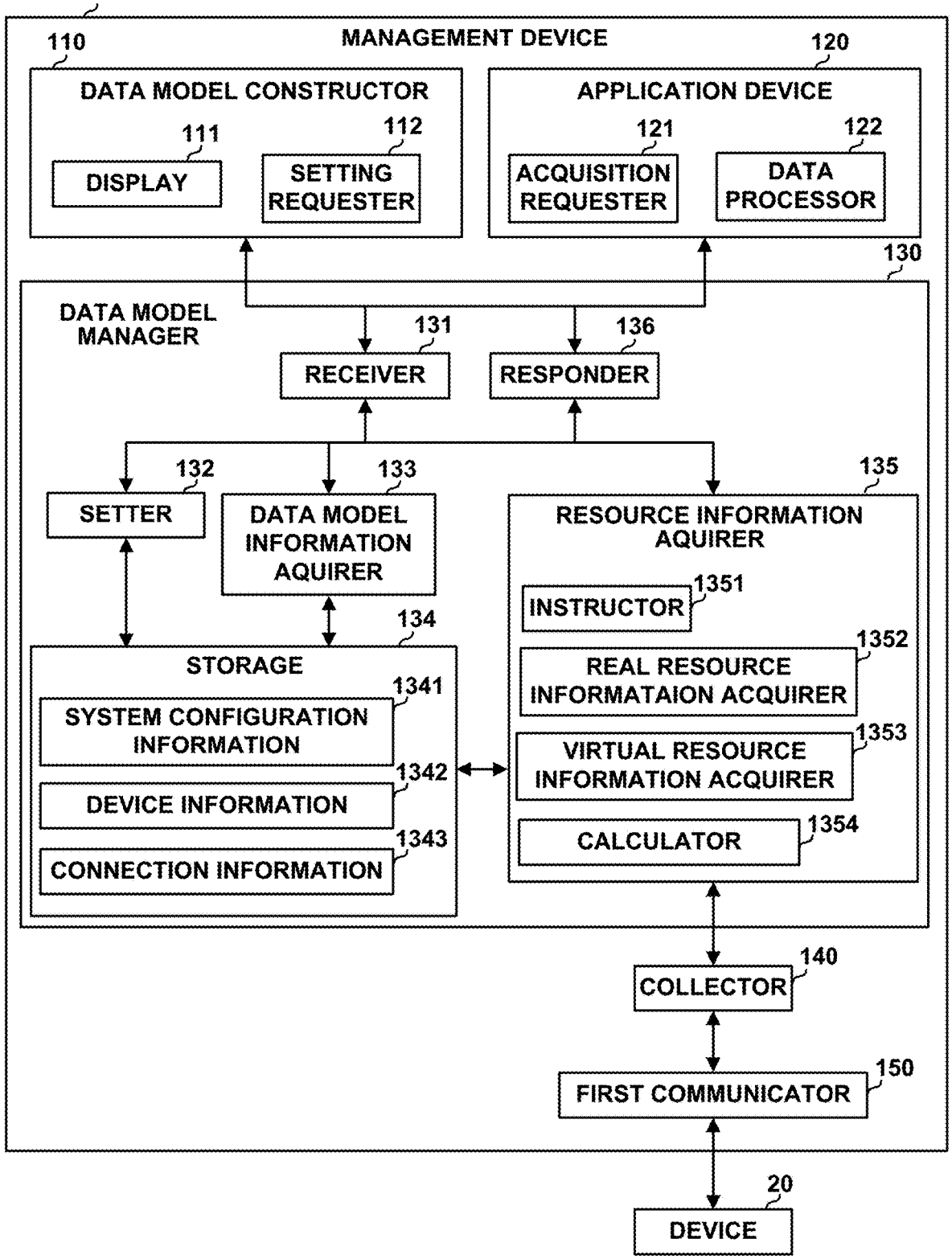
FIG. 5 is a functional block diagram illustrating the management device according to Embodiment 1.

FIG. 5 shows the functional configuration of each management device 10. Each management device 10 functionally includes a data model constructor 110 that forms and edits a data model, an application device 120 that acquires values using the data model and performs processing using the acquired values, a data model manager 130 that manages the data model, a collector 140 that collects values from each device 20, and a first communicator 150 that communicates with each device 20.

The data model constructor 110 is typically a function used by a factory line manager to design a data model. The application device 120 is a function used by, for example, a maintenance operator of a factory line to perform specific processing using data acquired using the data model. A constructor for a data model is referred to as a first user. A user of data in the data model is referred to as a second user.

Based on the operation performed by the first user, the data model constructor 110 performs a process for constructing a data model. The data model constructor 110 is typically a function provided by an engineering tool. The data model constructor 110 is implemented by the processor 101, the main storage 102, the input device 104, and the output device 105 in cooperation.

More specifically, the data model constructor 110 includes a display 111 that displays a data model, and a setting requester 112 that receives a setting request for forming and editing the data model from the first user. The data model constructor 110 is an example of data model construction means. The display 111 is an example of display means. The setting requester 112 is an example of setting request means.

The display 111 displays a data model.

More specifically, the display 111 displays a data model in FIG. 4 on the screen of the management device 10. In response to the first user operating the displayed data model, a setting request is generated.

The setting requester 112 receives various setting requests for forming and editing the data model from the first user. More specifically, the setting requests include a request for forming or editing the tree structure of a data model, and a request for adding or editing the real resource information, the virtual resource information, and/or the file resource information. The setting requester 112 transmits the received setting requests to the data model manager 130.

The setting requester 112 transmits the setting requests to the data model manager 130 in accordance with Object Linking and Embedding for Process Control (OPC) Unified Architecture (UA) protocol. Thus, the setting requester 112 is an OPC UA client.

For example, the setting requester 112 receives, from the first user, setting requests including an addition, a change, or deletion of real resource information such as FIRST TEMPERATURE SENSOR to, in, or from a data model.

The setting requester 112 also receives, from the first user, setting requests including an addition, a change, or deletion of a file resource such as DEVICE MANUAL to, in, or from a data model.

The setting requester 112 also receives, from the first user, setting requests for setting the definition of calculation of the virtual resource information.

The definition of the calculation is at least one of a function and a script that describes processing of a management device. The function and the script include the real resource information as an input value. For example, the definition of the calculation may be a function definition such as any of the four basic arithmetic operations, a bit operation, or a logical operation, or a definition that defines processing implemented using plug-in software.

For example, the setting requester 112 receives, from the first user, a request for setting a formula for calculating an average value between values from the first temperature sensor and the second temperature sensor in the device 22 as a definition of the calculation for acquiring the average temperature. The definition specified by the first user is incorporated into device information 1342 shown in FIG. 7 by a setter 132 in the data model manager 130 described later.

The application device 120 acquires information about the data model from the data model manager 130 and requests data based on the data model. In other words, the data model plays a role of showing, to the application device 120, information acquirable by the data model manager 130. The application device 120 performs various processes using the acquired values. The application device 120 is implemented by the functions provided by application software operable on the management device 10. Unlike the data model constructor 110, the application device 120 does not have the functions of forming and editing the data model, but simply has functions of acquiring configuration information about a data model and acquiring and updating values of real resource information and values of virtual resource information. The application device 120 is typically a function used by the second user but is also usable by the first user.

More specifically, the application device 120 includes an acquisition requester 121 that receives acquisition requests, and a data processor 122 that processes data acquired using the data model. The application device 120 is an example of application means. The acquisition requester 121 is an example of acquisition request means, and the data processor 122 is an example of data processing means.

The acquisition requester 121 receives, from the second user, acquisition requests for acquiring data based on the data model. More specifically, the acquisition requests are requests for acquiring the value of real resource information or the value of virtual resource information, and requests for acquiring information about the configuration of a data model. Information about the configuration of a data model is hereafter referred to as data-model configuration information. The data-model configuration information includes information indicating the tree structure of the data model. The acquisition requester 121 transmits the received acquisition request to the data model manager 130.

The acquisition requester 121 transmits an acquisition request to the data model manager 130 in accordance with the OPC UA protocol. Thus, the acquisition requester 121 corresponds to the OPC UA client.

For example, in response to the second user designating the node of FIRST TEMPERATURE SENSOR in the data model in FIG. 4 appearing on the screen to request a value, the acquisition requester 121 receives an acquisition request for acquiring the value of FIRST TEMPERATURE SENSOR. In response to the second user designating the node of AVERAGE TEMPERATURE in the data model in FIG. 4 appearing on the screen to request a value, the acquisition requester 121 receives an acquisition request for acquiring the value of AVERAGE TEMPERATURE.

An acquisition requester having the same functions as the acquisition requester 121 may be installed in the data model constructor 110. The application device 120 may not display a data model. Instead of receiving an operation from a user, the application device 120 may generate an acquisition request as appropriate. For example, the application device 120 may generate an acquisition request in accordance with a program.

The data processor 122 performs various processes based on data returned in accordance with the acquisition request. The processes performed by the data processor 122 vary depending on the functions provided by the application device 120.

The data model manager 130 performs processing or responses based on a request received from the data model constructor 110 and the application device 120.

More specifically, the data model manager 130 includes a receiver 131 that receives setting requests and acquisition requests, the setter 132 that sets a data model based on a setting request, a data model information acquirer 133 that acquires data-model configuration information based on an acquisition request, a storage 134 that stores information about the data model, a resource information acquirer 135 that acquires values of the real resource information and the virtual resource information included in the data model, and a responder 136 that returns responses to the request.

The receiver 131 receives setting requests and acquisition requests from the data model constructor 110 and the application device 120 in accordance with the OPC UA protocol, and the responder 136 returns responses to the data model constructor 110 and the application device 120 in accordance with the OPC UA protocol. Thus, the receiver 131 and the responder 136 form an OPC UA server. The receiver 131 includes a dedicated OPC UA interface that enables the data model constructor 110 alone to form and edit the data model.

The receiver 131 receives setting requests and acquisition requests. The receiver 131 is an example of receiving means.

The setter 132 interprets the setting request received by the receiver 131 in accordance with the OPC UA protocol, and incorporates the interpretation with information stored in the storage 134.

The data model information acquirer 133 interprets the acquisition request for the data-model configuration information received by the receiver 131 in accordance with the OPC UA protocol and acquires information corresponding to the interpretation from the storage 134.

The storage 134 stores system configuration information 1341 indicating the configuration of the device system 2, the device information 1342 about the devices 20 to be managed, and connection information 1343 indicating the connection state of the management device 10. The system configuration information 1341, the device information 1342, and the connection information 1343 are set and updated based on the setting request from the data model constructor 110. The storage 134 is implemented by the auxiliary storage 103. The storage 134 is an example of storage means.

The system configuration information 1341 defines the master/slave relationship between the devices 20 included in the device system 2. The system configuration information 1341 is used to show the system configuration in a tree view as illustrated in FIG. 2. The system configuration information 1341 includes information for identifying the management device 10 that manages the devices 20. Each management device 10 includes the same system configuration information 1341.

As illustrated in FIG. 6, the system configuration information 1341 is tabular data associating a line data identification (ID), a node name corresponding to a device or a line included in the device system 2, a parent node ID indicating a line data ID of a parent node, a management device ID indicating an ID of the management device 10 that manages each device 20, retrievability information indicating whether information about the device 20 is retrievable, and changeability information indicating whether information about the device 20 is changeable.

The node name is the name of the node that can be specified by a user as appropriate. The node name may be any name that represents the configuration of the device system 2. The node name may be, in addition to the name representing the device 20 and the name of the line on which the device 20 is installed, a name of the location of the line or the factory, or the name of the function of the device 20 on the line such as CONVEYER or CUTTER.

The system configuration information 1341 in FIG. 6 facilitates the user's understanding of the system configuration by indicating the highest node as LINE X. However, the present disclosure is not limited to such a configuration by indicating the highest node as LINE X, and the highest node may be the name of the device system 2, or blank data without being named.

The parent node ID is the line data ID of the parent node to which the node is subordinate. The system configuration information 1341 including information about the parent node indicates the master/slave relationship between the nodes. For example, the line data followed by the ID 5 indicates that the parent of the device 24 is the device 23 corresponding to the line data followed by the ID 4.

The management device ID is identification information for identifying the management device 10 that manages the device 20. The management device ID in FIG. 6 indicates the reference sign of each management device 10 illustrated in FIG. 1. For example, line data followed by the ID 5 indicates that the device 24 is managed by the management device 13.

The retrievability information indicates whether the information about the device 20 is retrievable from other management devices 10 and the application device 120. The label POSSIBLE indicates that the information is retrievable, and the label IMPOSSIBLE indicates that the information is not retrievable. For example, the line data followed by the ID 5 indicates that the management devices 11 and 12 and the application device 120 can retrieve information about the device 24 managed by the management device 13.

The changeability information indicates whether the information about the device 20 is changeable by other management devices 10 and the application device 120. The label POSSIBLE indicates that the information is changeable, and the label IMPOSSIBLE indicates that the information is not changeable. For example, the line data followed by the ID 5 indicates that the management devices 11 and 12 and the application device 120 cannot change the information about the device 24 managed by the management device 13.

The retrievability information and the changeability information can be set for other management devices 10 and the application device 120. When multiple application devices 120 are included, the retrievability information and the changeability information can be set for each of the application devices 120. For example, the retrievability and changeability may be set as POSSIBLE for the management device 11, and the retrievability may be set as POSSIBLE and the changeability may be set as IMPOSSIBLE for the management device 13. The retrievability and changeability may be set as POSSIBLE for one of the application devices 120, and the retrievability may be set as POSSIBLE and the changeability may be set as IMPOSSIBLE for another one of the application devices 120. For the application device 120 installed in an external terminal device that can communicate with the management device 10 as described later, retrievability information and changeability information of the external terminal device are written.

For example, when the first user creates a system configuration diagram illustrated in FIG. 2 using the user interface function provided by the data model constructor 110, the setter 132 generates the system configuration information 1341 illustrated in FIG. 6. The display 111 in the data model constructor 110 can display the system configuration of the device system 2 in a tree view with reference to the parent node IDs of the line data followed by the IDs 2 to 7 in the system configuration information 1341 illustrated in FIG. 6. In response to the first user specifying the management device ID, the retrievability information, and the changeability information through the user interface provided by the data model constructor 110, the setting request indicating the specified content is transmitted to the data model manager 130, and the setter 132 registers the specified content to the system configuration information 1341.

The device information 1342 is about the devices 20 managed by the management device 10. The device information 1342 includes information about terminal devices including sensors and motors included in each device 20 and other information about the device 20.

FIG. 7 shows the device information 1342 stored in the management device 12. The management device 12 manages the device 22. Thus, the device information 1342 stored in the management device 12 includes information about terminal devices and groups included in the device 22 and other information. The device information 1342 is tabular data associating a line data ID, a node name, a node type, a parent node ID indicating the line data ID of a parent node, a system configuration information ID indicating the line data ID of the device 20 in the system configuration information 1341, and detailed information about the node.

The node name can be designated as appropriate by a user. The node name is, for example, a device name, a name of a terminal device associated with the device, a file data name, a group name, or a name of an arithmetic operation.

The type indicates the node type. For example, the node in the type GROUP indicates that the node has a child node, the node in the type REAL RESOURCE indicates that the node shows the real resource information, the node in the type VIRTUAL RESOURCE indicates that the node shows the virtual resource information, and the node in the type FILE indicates that the node shows the file resource information stored in the storage 134 in a manner associated with the device 20.

In FIG. 7, the items indicating the terminal devices are associated with the node in the type REAL RESOURCE, and the items indicating AVERAGE TEMPERATURE and ALL SHAFTS OPERATION STATE acquired by performing the calculation defined by the user are associated with the node in the type VIRTUAL RESOURCE. The items indicating DEVICE MANUAL and MAINTENANCE INFORMATION are associated with the node in the type FILE.

The parent node ID is the line data ID of the parent node to which the node is subordinate. The device information 1342 including information about the parent node indicates the master/slave relationship between the nodes.

The system configuration information ID indicates the line data ID of the system configuration information in FIG. 6, indicating that the item associated with the node is information about a specific one of the devices 20 in the system configuration information. For example, the system configuration information ID 3 is associated with the line data IDs 2 to 11 in FIG. 7. The line data ID 3 in the system configuration information in FIG. 6 corresponds to DEVICE [22]. This reveals that the items associated with the nodes for the line data IDs 2 to 11 in FIG. 7 are information about the device 22.

The detailed information is associated with the node and is either information registered in accordance with the setting request from the data model constructor 110 or information referred to by the resource information acquirer 135. For example, in the nodes in the type REAL RESOURCE, input/output (I/O) addresses of sensors and motors are registered as detailed information such as D0, D1, D2, D3, X1, and X2. The resource information acquirer 135 refers to the I/O addresses to collect the values of the devices, as described later. In the nodes in the type VIRTUAL RESOURCE, the definitions of the calculations are registered as detailed information based on the setting requests received from the data model constructor 110. In the nodes in the type FILE, paths specifying file locations are registered as detailed information based on the setting requests received from the data model constructor 110.

A value retrieved from the I/O address, or specifically the value of real resource information, may be read or written from the data model constructor 110, an external terminal device, and the application device 120 through the OPC UA interface provided by the data model manager 130. In response to selection of file resource information in the data model in FIG. 4, a file associated with the selected file resource information may be activated with a tool linked with the file by an operating system (OS).

The detailed information for the virtual resources also includes arithmetic expressions using real resources such as (node ID [4]+node ID [6])/2 and node ID [8] & node ID [9] in FIG. 7. The values of the results of the arithmetic expressions are retrievable through the OPC UA interface provided by the data model manager 130.

Formation of a group VIRTUAL RESOURCE INFORMATION as in FIG. 7 is optional in a case of registration of a node corresponding to virtual resource information such as AVERAGE TEMPERATURE to the device information 1342. A group node VIRTUAL RESOURCE INFORMATION may be formed to register a node corresponding to virtual resource information, or virtual resource information may be subordinate to a group DEVICE 22 without forming a group node VIRTUAL RESOURCE INFORMATION. In some embodiments, virtual resource information may be on the same hierarchy as the real resource information such as FIRST/SECOND TEMPERATURE SENSOR and FIRST/SECOND PRESSURE SENSOR.

The connection information 1343 indicates whether each management device 10 is connected to the network 40, and whether each management device 10 is connectable to the corresponding device 20 managed by the management device 10. The connection information 1343 is used to show a user whether the devices 20 are accessible.

As illustrated in FIG. 8, the connection information 1343 is tabular data associating a line data ID, a management device ID for identifying the management device 10, the connection state of each management device 10, and connectability information about devices managed by each management device 10.

The management device ID is identification information for identifying the management device 10 that manages the device 20. The management device ID in FIG. 8 corresponds to the reference sign of each of the management devices 10 illustrated in FIG. 1.

The connection state indicates whether the management device 10 is connected to the network 40. The label ON-LINE indicates that the management device 10 is connected to the network 40, and the label OFF-LINE indicates that the management device 10 is disconnected from the network 40. In the connection state labeled as ON-LINE, whether the device 20 managed by the management device 10 is connectable can be checked. In the connection state labeled as OFF-LINE, the device 20 managed by the management device 10 is inaccessible.

The connectability information about the device indicates whether the device 20 is connectable through the network 30. Specifically, the connectability information indicates the connection state between the collector 140 and the device 20. The label POSSIBLE indicates that all the devices 20 managed by the management device 10 are connectable. A device name appearing in this field indicates that the device with the displayed device name is not connectable among the devices 20 managed by the management device 10.

The item CONNECTION STATE of the connection information 1343 is updated by the management device 10 monitoring the connection state with the network 40. The item DEVICE CONNECTABILITY INFORMATION is updated in predetermined cycles by the management device 10 checking the communication with the device 20 through the network 30. Every time point at which the data model manager 130 receives acquisition requests for the real resource information and the virtual resource information, the communication with the device 20 corresponding to the acquisition requests alone may be checked as appropriate. In that case, the item DEVICE CONNECTABILITY INFORMATION in the connection information 1343 may be eliminated.

The data model constructor 110 and the application device 120 in FIG. 5 can acquire the system configuration information 1341, the device information 1342, and the connection information 1343, and display the system configuration information 1341, the device information 1342, and the connection information 1343 on the screen. The system configuration information 1341, the device information 1342, and the connection information 1343 may be used by a program different from the data model constructor 110 and the application device 120.

The resource information acquirer 135 acquires the value of real resource information or the value of virtual resource information in accordance with an acquisition request received by the receiver 131 and returns the requested value to a requester. The resource information acquirer 135 is implemented by the processor 101 and the main storage 102.

More specifically, the resource information acquirer 135 includes an instructor 1351 that issues instructions based on the request received by the receiver 131, a real resource information acquirer 1352 that acquires the values of real resource information based on the instructions, a virtual resource information acquirer 1353 that acquires the value of virtual resource information based on the instructions, and a calculator 1354 that performs calculation for acquiring the value of virtual resource information.

In response to an acquisition request for the real resource information received by the receiver 131, the instructor 1351 causes the real resource information acquirer 1352 to acquire the values of real resource information. In response to an acquisition request for the virtual resource information received by the receiver 131, the instructor 1351 causes the virtual resource information acquirer 1353 to acquire the value of virtual resource information. The instructor 1351 is an example of instructing means.

For example, when the receiver 131 receives an acquisition request requesting the value of FIRST TEMPERATURE SENSOR, the instructor 1351 instructs the real resource information acquirer 1352 to acquire the value of FIRST TEMPERATURE SENSOR. When the receiver 131 receives an acquisition request requesting the value of AVERAGE TEMPERATURE, the instructor 1351 instructs the virtual resource information acquirer 1353 to acquire the value of AVERAGE TEMPERATURE.

The real resource information acquirer 1352 causes the collector 140 to collect values collectable from the device associated with the real resource information to acquire the values of real resource information. The real resource information acquirer 1352 is an example of real resource information acquiring means.

More specifically, when the real resource information acquirer 1352 receives an instruction from the instructor 1351 to acquire the value of FIRST TEMPERATURE SENSOR, the real resource information acquirer 1352 acquires an I/O address D0 of FIRST TEMPERATURE SENSOR with reference to the detailed information in the device information 1342. The real resource information acquirer 1352 identifies the device having the I/O address D0 as the device 22 with reference to the device information 1342 and identifies the management device 10 that manages the device 22 as the management device 12 with reference to the system configuration information 1341. When the real resource information acquirer 1352 determines that the management device 12 is in the on-line state and the device 22 is connectable with reference to the connection information 1343, the real resource information acquirer 1352 instructs the collector 140 to collect the values of the device 22 having the I/O address D0. In some embodiments, when the real resource information acquirer 1352 determines that the management device 12 is in the on-line state, the real resource information acquirer 1352 may check whether the device 22 having the I/O address D0 is connectable through the collector 140. When the device 22 is connectable, the collector 140 acquires a value and transmits the value to the real resource information acquirer 1352. Upon receiving a value of, for example, 24° C. from the collector 140, the real resource information acquirer 1352 transmits the value to the responder 136 through the instructor 1351. When the real resource information acquirer 1352 determines that the management device 12 is in the off-line state or the device 22 having the I/O address D0 is not connectable with reference to the connection information 1343, the real resource information acquirer 1352 notifies the failure in collecting the value to the responder 136 through the instructor 1351.

The virtual resource information acquirer 1353 causes the real resource information acquirer 1352 to acquire the values of real resource information used in the calculation for acquiring the value of virtual resource information, and causes the calculator 1354 to perform calculation using the acquired values of real resource information to acquire the value of virtual resource information. The virtual resource information acquirer 1353 is an example of virtual resource information acquiring means.

More specifically, in response to an instruction from the instructor 1351 to acquire the value of AVERAGE TEMPERATURE, the virtual resource information acquirer 1353 interprets the definition of the arithmetic expression in AVERAGE TEMPERATURE with reference to the detailed information in the device information 1342. Interpreting the definition refers to identifying the real resource information included in the definition. The virtual resource information acquirer 1353 identifies the real resource information included in the arithmetic expression as FIRST TEMPERATURE SENSOR and SECOND TEMPERATURE SENSOR, and transmits a request for acquiring the values of the identified real resource information to the instructor 1351.

In accordance with the request transmitted from the virtual resource information acquirer 1353, the instructor 1351 instructs the real resource information acquirer 1352 to acquire the values of FIRST TEMPERATURE SENSOR and SECOND TEMPERATURE SENSOR. In response to the instruction from the instructor 1351 to acquire the values of FIRST TEMPERATURE SENSOR and SECOND TEMPERATURE SENSOR, the real resource information acquirer 1352 acquires an I/O address D0 of FIRST TEMPERATURE SENSOR and an I/O address D2 of SECOND TEMPERATURE SENSOR with reference to the detailed information in the device information 1342. The real resource information acquirer 1352 then instructs the collector 140 to collect the values of the devices having the I/O addresses D0 and D2. Upon receiving the values, such as 24° C. and 26° C. from the collector 140, the real resource information acquirer 1352 transmits the values to the instructor 1351.

The instructor 1351 transmits the values 24 and 26 received from the real resource information acquirer 1352 to the virtual resource information acquirer 1353. Upon receiving the value 24 of FIRST TEMPERATURE SENSOR and the value 26 of SECOND TEMPERATURE SENSOR, the virtual resource information acquirer 1353 requests the calculator 1354 through the instructor 1351 to perform the calculation using the received values in accordance with the arithmetic expression (value of first temperature sensor+ value of second temperature sensor)/2. When the calculator 1354 ends the calculation, the virtual resource information acquirer 1353 acquires the calculation result 25° C. through the instructor 1351. The virtual resource information acquirer 1353 then transmits the calculation result to the responder 136 through the instructor 1351.

The calculator 1354 performs the calculation for acquiring the value of virtual resource information. The calculator 1354 is an example of calculating means.

More specifically, the calculator 1354 performs the calculation in accordance with the values of real resource information transmitted from the virtual resource information acquirer 1353 through the instructor 1351 and the arithmetic expression specified by the virtual resource information acquirer 1353.

In response to an acquisition request for the real resource information received by the receiver 131, the responder 136 returns a response including the values of real resource information acquired by the real resource information acquirer 1352 to the requester. In response to an acquisition request for the virtual resource information received by the receiver 131, the responder 136 returns a response including the value of virtual resource information acquired by the virtual resource information acquirer 1353 to the requester. In response to the setting request received by the receiver 131, the responder 136 returns a response corresponding to the requested settings. The responder 136 is an example of response means.

For example, in response to an acquisition request for the value of FIRST TEMPERATURE SENSOR from the application device 120, the responder 136 returns the value 24 acquired by the real resource information acquirer 1352 to the application device 120. In response to an acquisition request for the value of AVERAGE TEMPERATURE from the application device 120, the responder 136 returns the value 25 acquired by the virtual resource information acquirer 1353 to the application device 120. When receiving no requested value from the real resource information acquirer 1352 or the virtual resource information acquirer 1353, the responder 136 returns an error message to the application device 120.

The collector 140 collects values collectable from the device 20 associated with the real resource information. The collector 140 is implemented by the processor 101. The first communicator 150 is used for connection to the network 30 and is implemented by the communicator 106. The collector 140 is an example of collecting means.

The values collectable from the devices 20 are herein any values associated with the devices 20, including values measured by the devices 20 and the values set to the devices. More specifically, in response to a request designated as the I/O address D0 from the real resource information acquirer 1352, the collector 140 transmits a request for acquiring a value to the device 22 having the I/O address D0. When receiving the value from the device 22, the collector 140 transmits the value to the real resource information acquirer 1352.

The collector 140 transmits the value to the real resource information acquirer 1352 after adding the time point at which the value is collected to the value. The collection time point is provided to the user as a time stamp described later.

When the calculation uses multiple pieces of real resource information, the virtual resource information acquirer 1353 acquires the value of virtual resource information based on the values of multiple pieces of real resource information that are collected by the collector 140 at the time points matching one another. For example, when the time points indicated by the time stamps transmitted by the real resource information acquirer 1352 for the values of multiple pieces of real resource information fail to match, the virtual resource information acquirer 1353 causes the collector 140 to perform the collection process again through the real resource information acquirer 1352.

The time points matching one another herein refers to the collection time points equal to one another or within a predetermined time difference between the collection time points (e.g., 0.5 seconds). The time difference may be set by the first user or the second user as appropriate.

For example, in response to a response including the requested value from the responder 136 in the data model manager 130, the application device 120 displays a table illustrated in FIG. 9 on the screen. The table in FIG. 9 shows, in a manner associated with one another, the name of the device from which the values of real resource information or virtual resource information are acquired, the name of resource information indicating the content of the real resource information or the virtual resource information, the acquired value, the time stamp indicating the time point at which the collector 140 collects the value, and the I/O address of the real resource information or the arithmetic expression indicating the content of the calculation of the virtual resource information.

The table in FIG. 9 may enable inputs by bringing a cursor over the values of real resource information, and enable rewriting of the values of the device with an input of a value.

Figure 10A:
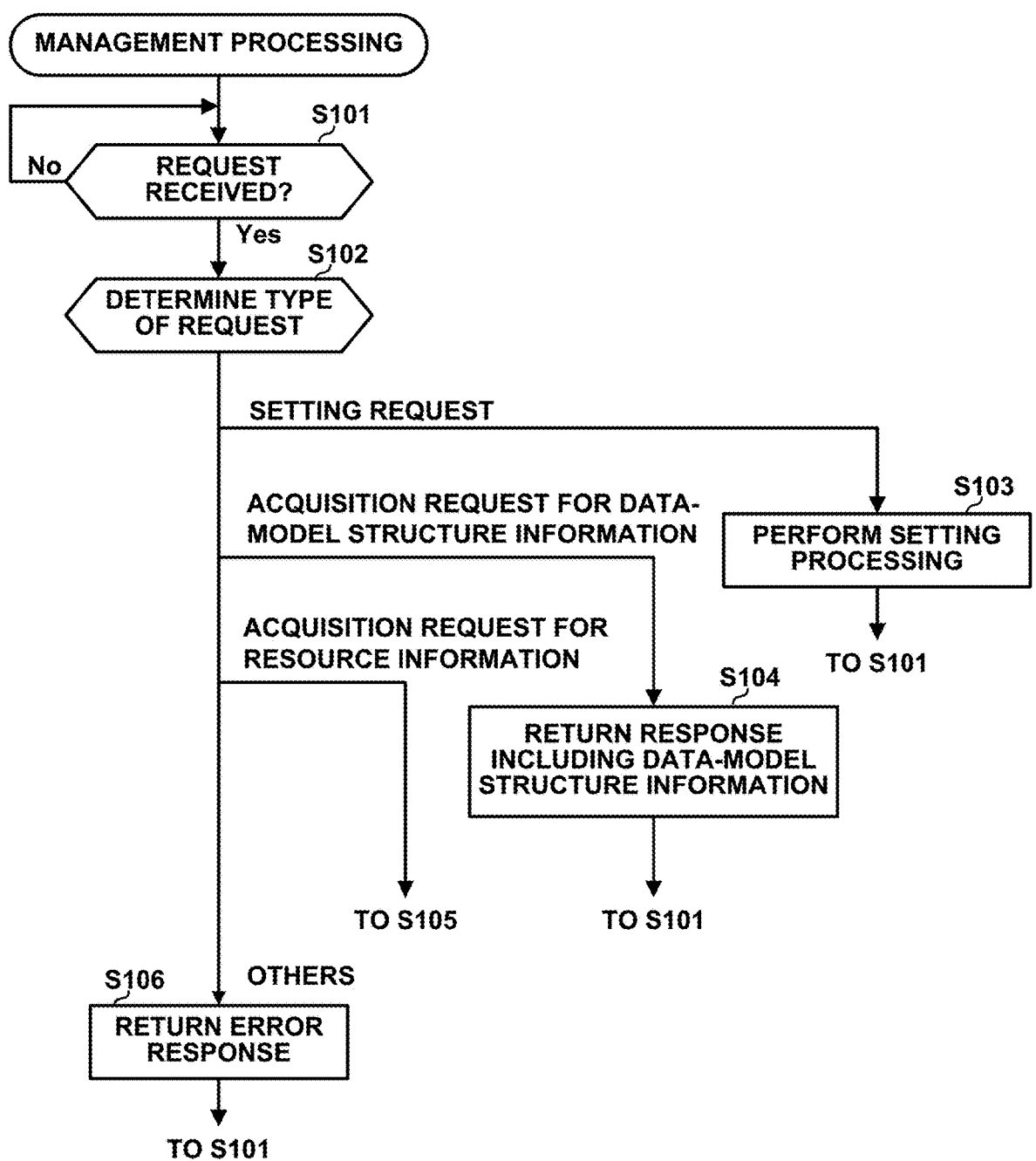
FIG. 10A is a flowchart illustrating management processing according to Embodiment 1.
Figure 10B:
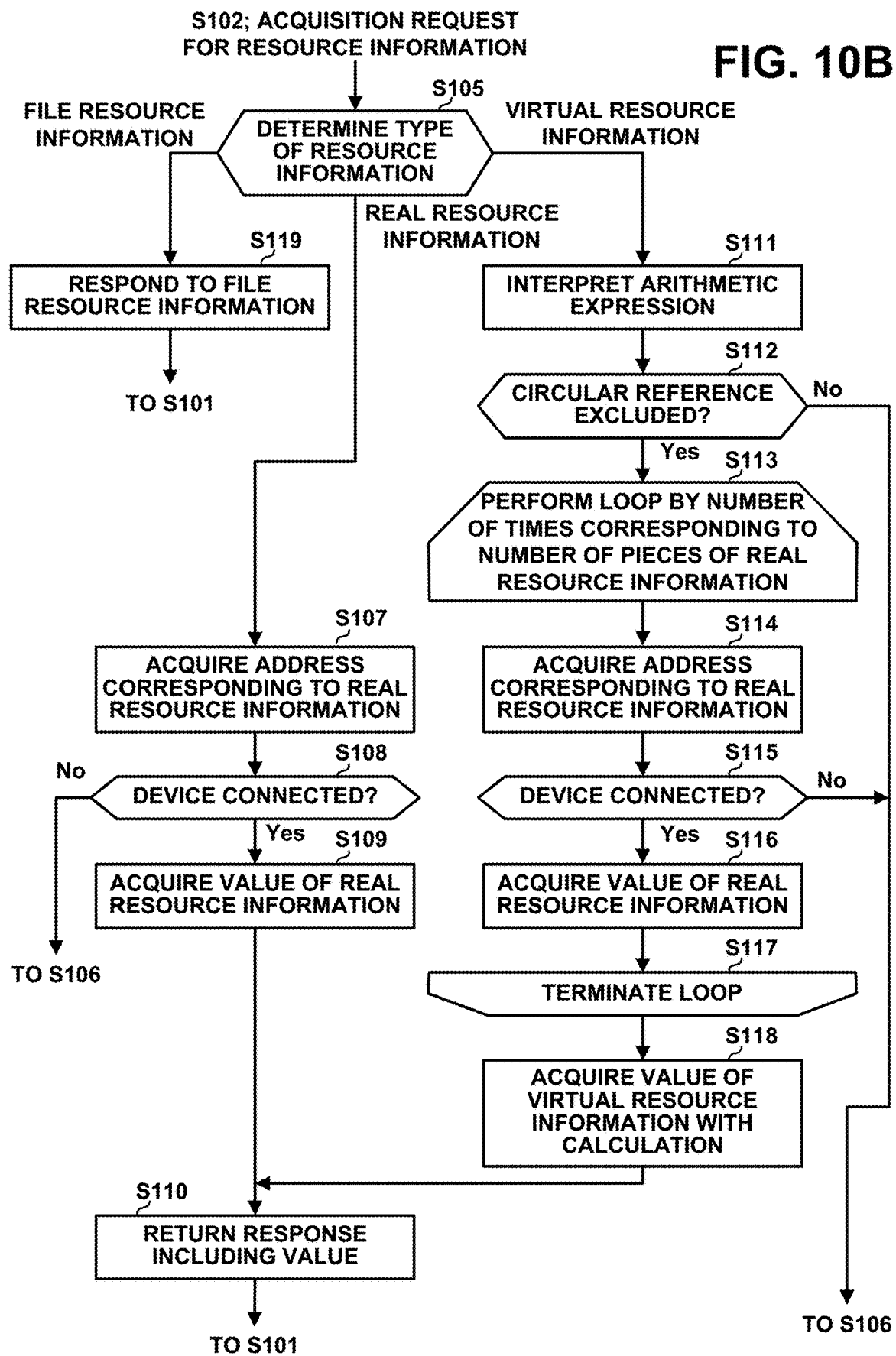
FIG. 10B is a flowchart illustrating management processing according to Embodiment 1.

With reference to the flowcharts in FIGS. 10A and 10B, management processing performed by the data model manager 130 in the management device 10 according to the present embodiment will now be described. In response to the management device 10 being powered on, the management processing illustrated in FIGS. 10A and 10B is started. The management processing illustrated in FIGS. 10A and 10B is performed by the data model manager 130 in response to a request transmitted from the data model constructor 110 or the application device 120.

The receiver 131 determines whether the receiver 131 has received a request (step S101). When determining receipt of a request (Yes in step S101), the receiver 131 determines the type of the request (step S102). When determining no receipt of a request (No in step S101), the receiver 131 stays on standby.

When determining that the received request is a setting request (setting request in step S102), the receiver 131 transmits the setting request to the setter 132, and the setter 132 performs setting processing in accordance with the received setting request (step S103).

When determining that the received request is an acquisition request for data-model configuration information (acquisition request for data-model configuration information in step S102), the receiver 131 transmits the acquisition request to the data model information acquirer 133, the data model information acquirer 133 acquires data-model configuration information with reference to the storage 134, and the responder 136 returns a response including the acquired data-model configuration information to the requester (step S104).

When determining that the received request is an acquisition request for resource information (acquisition request for resource information in step S102), the processing advances to step S105.

When the receiver 131 determines that the received request is other than a setting request, an acquisition request for data-model configuration information, and an acquisition request for resource information (others in step S102), the responder 136 returns an error response to the requester (step S106).

In step S105, the receiver 131 determines the type of the received acquisition request for resource information (step S105). When the receiver 131 determines that the received acquisition request is an acquisition request for acquiring the value of real resource information (real resource information in step S105), the real resource information acquirer 1352 acquires, based on instructions from the instructor 1351, an address of the device for which a value is requested with reference to the device information 1342 stored in the storage 134 (step S107).

Subsequently, the real resource information acquirer 1352 determines whether the real resource information acquirer 1352 is connectable to the device for which the value of real resource information is requested (step S108). When determining that the real resource information acquirer 1352 is connectable to the device for which the value is requested (Yes in step S108), the real resource information acquirer 1352 causes the collector 140 to collect the value of the device, and acquires the value of real resource information (step S109). More specifically, the real resource information acquirer 1352 identifies the I/O address of the requested real resource information with reference to the device information 1342 stored in the storage 134, and determines whether the management device 10 that manages the device 20 with the identified I/O address is in the connection state, and whether the management device 10 is connectable to the device 20 with the I/O address. When determining that the management device 10 is connectable to the device 20, the real resource information acquirer 1352 causes the collector 140 to collect the value of the device with the acquired I/O address, and acquires the value from the collector 140. In step S108, the real resource information acquirer 1352 may check the connectability with direct communication with the device 20 with the identified I/O address.

In step S108, when the real resource information acquirer 1352 determines that the management device 10 is not connectable to the device 20 for which the value is requested (No in step S108), the responder 136 returns an error response (step S106). More specifically, when the management device 10 is disconnected from the network 40, or when the device 20 is disconnected from the network 30, the responder 136 transmits a message indicating that the management device 10 fails to access the device 20 to the requester of the acquisition request.

In step S109, when the real resource information acquirer 1352 acquires the value of real resource information, the responder 136 returns a response including the acquired value to the requester of the acquisition request (step S110).

In step S105, when the receiver 131 determines that the received acquisition request is an acquisition request for acquiring the value of virtual resource information (virtual resource information in step S105), the virtual resource information acquirer 1353 interprets the definition of the calculation for acquiring the requested value of virtual resource information with reference to the detailed information in the device information 1342 (step S111).

The virtual resource information acquirer 1353 then determines whether the calculation includes a circular reference (step S112). When determining that the calculation excludes a circular reference (Yes in step S112), the virtual resource information acquirer 1353 performs a loop to repeat acquisition of the value of real resource information (steps S114, S115, and S116) with the real resource information acquirer 1352 by the number of times corresponding to the number of all the pieces of real resource information included in the calculation (step S113).

The processes in steps S114, S115, and S116 are respectively similar to steps S107, S108, and S109. During the repeated processes, in response to the real resource information acquirer 1352 determining that the real resource information acquirer 1352 fails to be connected to the device 20 (No in step S115), the virtual resource information acquirer 1353 terminates the loop, and the responder 136 returns an error response to the requester of the acquisition request (step S106).

In step S112, when the virtual resource information acquirer 1353 determines that the calculation includes a circular reference (No in step S112), the responder 136 returns an error response to the requester of the acquisition request (step S106).

In response to the real resource information acquirer 1352 acquiring the values of all the pieces of real resource information, the virtual resource information acquirer 1353 terminates the loop (step S117). The virtual resource information acquirer 1353 causes the calculator 1354 to perform calculation with the acquired values of real resource information, and acquires the value of virtual resource information (step S118). The responder 136 then returns a response including the acquired value to the requester of the acquisition request (step S110).

In step S105, when the receiver 131 determines that the received acquisition request is an acquisition request for acquiring file resource information (file resource information in step S105), the responder 136 provides a file associated with the file resource information to the requester (step S119).

To calculate the value of virtual resource information with an application of a management device, a known management device transmits the values of real resource information to be used for calculating the virtual resource information to the application one by one from a data model manager, and performs the calculation on the application after receiving all the values of real resource information to be used for the calculation. In contrast, in response to a request for the value of virtual resource information, the management device 10 according to the present embodiment returns the calculation result of the calculation alone to the requester, and thus can eliminate returning of the values of the devices to be used for the calculation.

There is a problem that a known management device causes the time intervals between the collections of the values of real resource information. In the present embodiment, instead of the application device 120 calculating the virtual resource information, the resource information acquirer 135 in the data model manager 130 performs calculation based on the collected value. Thus, the values can be retrieved from multiple devices with a minimum time difference, thereby enabling improvement of the accuracy of the calculation results can be improved.

When a known management device receives an acquisition request for the value of virtual resource information from the application, the acquisition requests for values of multiple pieces of real resource information are transmitted through the receiver and the first communicator. This increases the volume of data that is transmitted through the receiver and the traffic of the first communicator, and thus simultaneous acquisition of the values of multiple pieces of real resource information is difficult. In the present embodiment, when an acquisition request for the value of virtual resource information is transmitted from the application device 120, the acquisition request for the virtual resource information alone is transmitted through the receiver 131, and the acquisition request for the real resource information is transmitted through only the first communicator 150. This can reduce the time difference.

Also in a case in which an acquisition request is transmitted from the data model constructor 110, the management device 10 according to the present embodiment has similar effects as a case in which an acquisition request is transmitted from the application device 120.

Embodiment 2

A management device 10 according to Embodiment 2 has the functions of acquiring the value of real resource information about the device 20 in advance and acquiring the value of virtual resource information in advance.

The same components as in Embodiment 1 are denoted with the same reference signs and will not be described.

Figure 11:
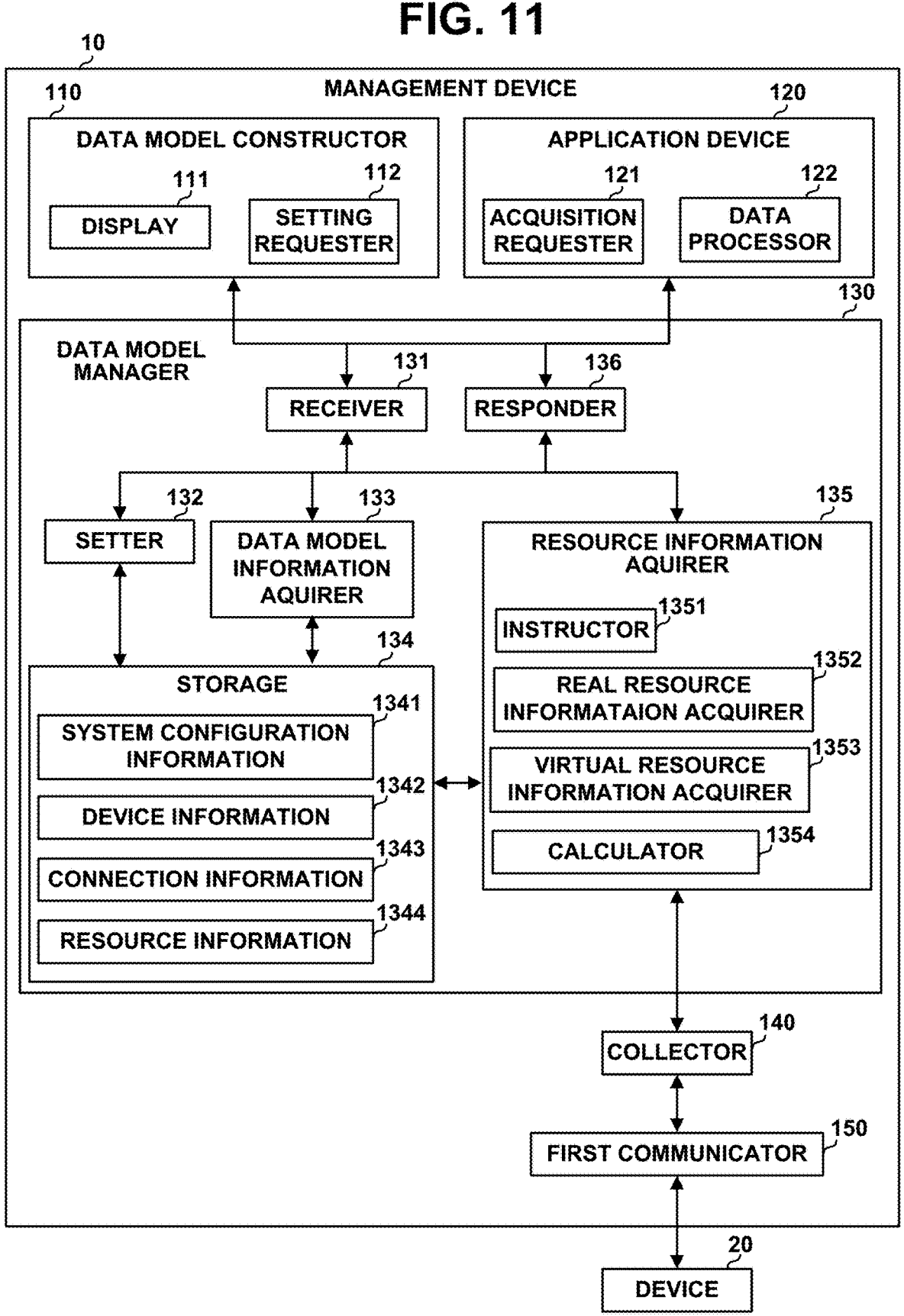
FIG. 11 is a functional block diagram illustrating a management device according to Embodiment 2.

As illustrated in FIG. 11, the management device 10 according to the present embodiment stores, in the storage 134, the system configuration information 1341, the device information 1342, the connection information 1343, and resource information 1344.

The resource information 1344 includes the values of real resource information collected by the collector 140 in predetermined cycles, and the values of virtual resource information calculated in advance by the calculation based on the collected values of real resource information.

As illustrated in FIG. 12, the resource information 1344 is tabular data associating the line data ID, the resource information name indicating the content of the resource information, the type of the resource information, the values collected or calculated through calculation, and time stamps each indicating the collection time point or a time point at which the calculation is performed.

The resource information name indicates the name of the collected resource information.

The type indicates the type of the resource information. The resource information in the type REAL RESOURCE indicates that the information is the real resource information, whereas the resource information in the type VIRTUAL RESOURCE indicates that the information is the virtual resource information.

For the information in the type REAL RESOURCE, the values are collected by the collector 140. For the information in the type VIRTUAL RESOURCE, the values are calculated through calculation.

For the information in the type REAL RESOURCE, the time stamp indicates the time point at which the value is collected by the collector 140. For the information in the type VIRTUAL RESOURCE, the time stamp indicates the time point at which the value is calculated through calculation.

The real resource information acquirer 1352 in FIG. 11 causes the collector 140 to acquire the values of real resource information in predetermined cycles, and registers the acquired values to the resource information 1344 stored in the storage 134. The cycles may be set by the first user of the management device 10.

When the collector 140 acquires the values of real resource information in the predetermined cycles, the virtual resource information acquirer 1353 causes the calculator 1354 to perform calculation using the values of real resource information acquired in the predetermined cycles, and registers the calculation result to the resource information 1344 stored in the storage 134.

When the receiver 131 receives an acquisition request for acquiring the value of real resource information or virtual resource information, the responder 136 retrieves data in the resource information 1344, and returns a response including the requested value to the requester of the acquisition request. Thus, the processing to be performed by the collector 140 in response to the request is eliminated. When the receiver 131 receives an acquisition request for the virtual resource information, the calculation to be performed for the value of virtual resource information in response to the request is eliminated.

In the management device 10 according to Embodiment 1, the resource information acquirer 135 acquires values from the device 20 through the collector 140 in response to an acquisition request. In contrast, the management device 10 according to the present embodiment eliminates the processing of the collector 140 performed in response to the acquisition request. Thus, the response is not delayed due to a delay in communication with the first communicator 150.

In the present embodiment, the management device 10 acquires the real resource information and the virtual resource information in advance. Thus, in response to an acquisition request from the data model constructor 110 or the application device 120, the management device 10 can return a response with the processing within the management device 10 without communicating with the device 20 through the network 30. In response to an acquisition request for the virtual resource information, the management device 10 can perform the calculation in advance. The present embodiment thus improves the responsiveness of the management device 10.

Modification 1

In addition to the embodiments of the present disclosure described above, the present disclosure can be embodied in various other modifications or applications.

The management device 10 according to Embodiment 1 or 2 includes the application device 120. However, the configuration of the management device 10 is not limited to such a configuration, and the application device 120 may be installed outside the management device 10.

Figure 13:
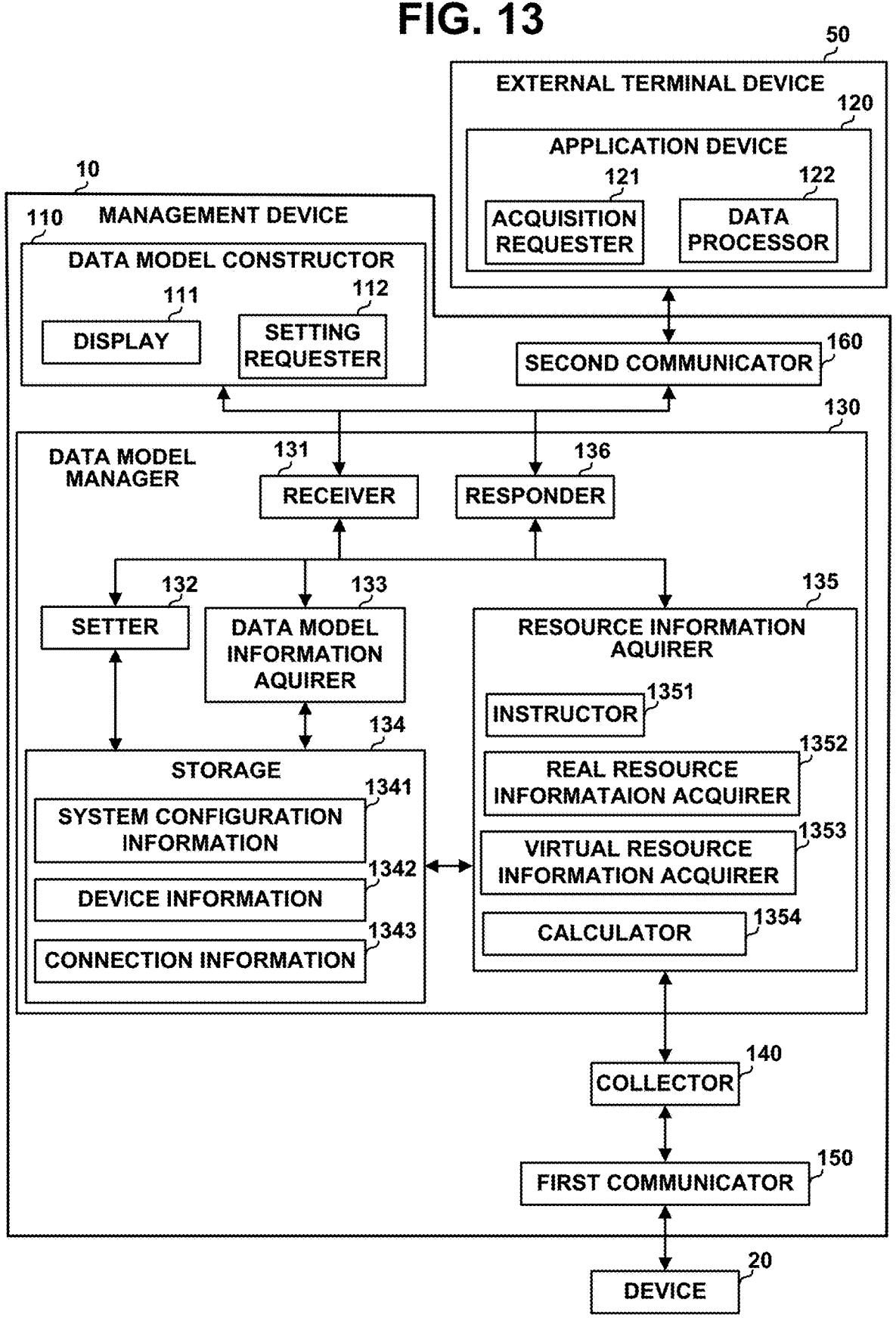
FIG. 13 is a functional block diagram illustrating a management system according to Modification 1.

As illustrated in FIG. 13, for example, the application device 120 according to Embodiment 1 or 2 is installed in an external terminal device 50 that can communicate with the management device 10. The management device 10 receives, from the external terminal device 50, an acquisition request for acquiring the value of real resource information or virtual resource information through a second communicator 160 and transmits a response including the requested value or an error response to the external terminal device 50.

The external terminal device 50 is connected to a network to exchange information with the management device 10 through the second communicator 160. Besides an industrial network, the network to which the external terminal device 50 is connected may be a wired or wireless network, such as the Internet, an intranet, an extranet, a local area network (LAN), a virtual private network (VPN), or a telephone network. The network to which the external terminal device 50 is connected may be the network 30 or another network. The second communicator 160 is implemented by the communicator 106.

The management device 10 includes the virtual resource information acquirer 1353, and thus can retain information acquired from the device 20 within the management device 10. In response to an acquisition request for the virtual resource information from the external terminal device 50, the management device 10 can hide, from the external terminal device 50 for security improvement, the information acquired from the device 20.

In response to a request for the calculation result from the external terminal device 50, the management device 10 returns the calculation result alone through the second communicator 160. Thus, the management device 10 can reduce traffic used for returning the values of the device to be used for calculation.

Modification 2

The management device 10 according to Embodiment 1 or 2 includes the data model constructor 110. However, the configuration of the management device 10 is not limited to such a configuration, and the data model constructor 110 may be installed outside the management device 10.

Figure 14:
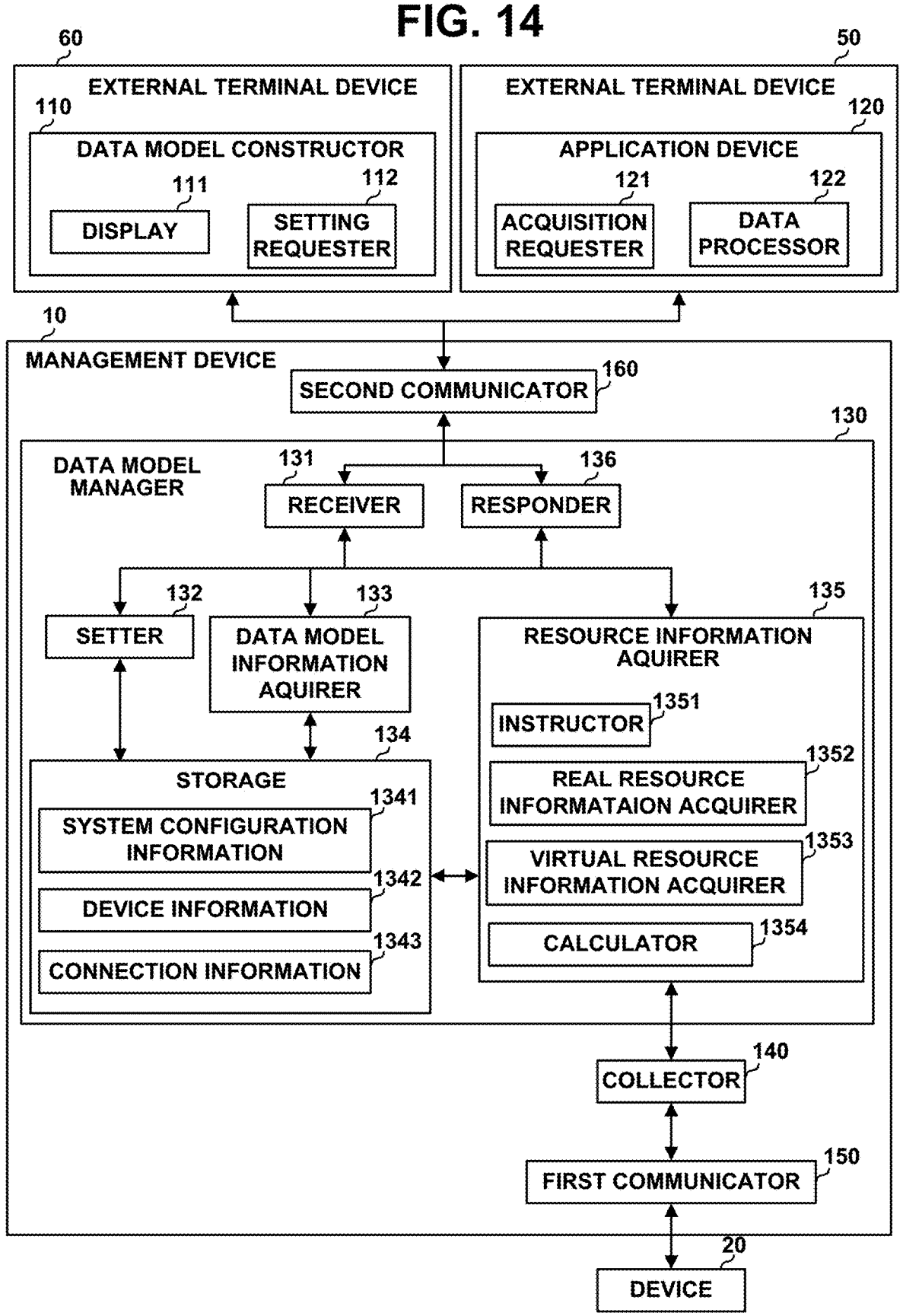
FIG. 14 is a functional block diagram illustrating a management system according to Modification 2.

As illustrated in FIG. 14, for example, the data model constructor 110 according to Embodiment 1 or 2 is installed in an external terminal device 60 that can communicate with the management device 10. The management device 10 receives, through the second communicator 160, a setting request for forming and editing a data model from the external terminal device 60 and performs the settings on the data model.

To allow the external terminal device 60 including the data model constructor 110 alone to, for example, set and edit the system configuration information 1341, the device information 1342, and the connection information 1343, an OPC UA interface usable by the external terminal device 60 alone may be prepared. The second communicator 160 may use a protocol for the use of the external terminal device 60 alone.

For a remotely located device 20 from which a value is to be collected, there is a case in which the management device 10 including the functions of the data model manager 130 and the collector 140 alone is required to be placed adjacent to the device 20 and the operation is required to be remotely performed by the data model constructor 110. Even if the device 20 is a remotely located, the management system 1 illustrated in FIG. 14 enables a user to form and edit a data model and to acquire the values of real resource information and virtual resource information without paying attention to the locations of the device 20 and the management device 10.

Other Modifications

In the above modifications, the data model constructor 110 and the application device 120 are installed in the external terminal device by way of example, but the management device may have another configuration.

For example, the data model constructor 110, the application device 120, the data model manager 130, and the collector 140 may be installed in different devices. These functional components may be partly installed in the same device, and may be partly installed in other devices to enable any combination of components. One or more application devices 120 may be included. In FIG. 13, for example, the application device 120 may also be installed in the management device 10, in addition to the external terminal device 50.

In the above embodiments, a production system for manufacturing products installed at a facility such as a factory is described as an example of the management system 1, but the management system 1 is not limited to this. The management system 1 may be a manufacturing system, a processing system, an inspection system, an industrial control system, or another system. The management system 1 may be installed at a plant including a power plant, a vehicle including a car, an airplane, and a vessel, an office building, or a public facility such as a school.

In the above embodiments, data models are formed for multiple devices 20 included in the device system 2, but this is not limitative. A data model may be formed for the entire management system 1 including the management devices 10. In some embodiments, a data model may be formed for only the management device 10 to be used by the user, or data models may be formed for other management devices 10. The system configuration information 1341 indicates the relationship between the devices 20. In some embodiments, the node may include the management device 10 and define the relationship between the management device 10 and the device 20.

In the above embodiments, a data model is formed by the first user, but this is not limitative. For example, a data model may be copied from another device. In some embodiments, a data model may be formed by software including artificial intelligence (AI).

In the above embodiments, six devices 20 are included by way of example, but the number of devices is not limited to six, and may be any number.

In the management system 1 according to the above embodiments and the management system 1 according to the above modifications, the management device 10 includes the storage 134 that stores the system configuration information 1341, the device information 1342, the connection information 1343, and the resource information 1344. However, the configuration of the management device 10 is not limited to such a configuration, and the management device 10 may have another structure. For example, an external server device may include a storage 134, and the management device 10 may access the external server device including the storage 134 as appropriate. In some embodiments, an external server device may store at least one of the system configuration information 1341, the device information 1342, the connection information 1343, and the resource information 1344 in the storage of the external server device, the management device 10 may store the remaining information in the storage of the management device 10, and the storage of the external server device and the storage of the management device 10 may be collectively regarded as the storage 134 according to the above embodiments.

In the above embodiments, the virtual resource information acquirer 1353 acquires the value of virtual resource information based on the values of multiple pieces of real resource information collected from the collector 140 at the time points matching one another, but this is not limitative. For example, each device 20 may have the function of measuring time, and the virtual resource information acquirer 1353 may acquire the value of virtual resource information using the values of multiple pieces of real resource information that match the time points measured by the devices 20. The times of the devices 20 are synchronized in advance.

In Embodiment 2, the resource information 1344 includes the values of real resource information collected in the predetermined cycles and the values of virtual resource information calculated in advance based on the collected values of real resource information. However, the present disclosure is not limited to such a technical feature, and the resource information 1344 may include either the values of real resource information or the values of virtual resource information.

The functions of the management device 10 may be implemented by dedicated hardware or a general-purpose computer system.

For example, the program P1 executed by the processor 101 may be stored in a non-transitory computer-readable recording medium for distribution, and installed in a computer to provide, for example, a device that performs the above management processing. Examples of such recording media include a flexible disk, a compact disc read-only memory (CD-ROM), a digital versatile disc (DVD), and a magneto-optical (MO) disc.

In some embodiments, the program P1 may be stored in a disk device included in a server device on a communication network, typically the Internet, and may be, for example, superimposed on carrier waves to be downloaded to a computer.

The above management processing may also be performed by the program P1 being activated and executed while being transferred through a communication network.

The above management processing may also be performed by the program P1 being entirely or partially executed on a cloud server device with a computer transmitting and receiving information about the processing through a communication network.

In the system with the above functions of the management device 10 implementable, for example, partly by the operating system (OS) or through cooperation between the OS and applications, portions related to the part other than the OS may be stored in a medium for distribution or may be downloaded to a computer.

Means for implementing the functions of the management device 10 is not limited to software, and the functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used for management of information about a large number of devices included in a system.

REFERENCE SIGNS LIST

1 Management system
2 Device system
10, 11, 12, 13 Management device
20, 21, 22, 23, 24, 25, 26 Device
30, 40 Network
50, 60 External terminal device
101 Processor
102 Main storage
103 Auxiliary storage
104 Input device
105 Output device
106 Communicator
107 Bus
110 Data model constructor
111 Display
112 Setting requester
120 Application device
121 Acquisition requester
122 Data processor
130 Data model manager
131 Receiver
132 Setter
133 Data model information acquirer
134 Storage
135 Resource information acquirer
136 Responder
140 Collector
150 First communicator
160 Second communicator
231 Bus
1341 System configuration information
1342 Device information
1343 Connection information
1344 Resource information
1351 Instructor
1352 Real resource information acquirer
1353 Virtual resource information acquirer
1354 Calculator
U1 User
P1 Program

The invention claimed is:

1. A management device for managing resource information values provided based on a data model that includes real resource information associated with a device connected to a network, and virtual resource information associated with a calculation result of calculation performed using a value of the real resource information, the management device comprising:
a receiver to receive an acquisition request generated based on the data model to acquire the value of the real resource information or a value of the virtual resource information;
a calculator to perform the calculation to obtain the calculation result;
a real resource information acquirer to acquire the value of the real resource information by causing a collector to collect a value from the device associated with the real resource information;
a virtual resource information acquirer to acquire the value of the virtual resource information by causing the calculator to perform the calculation using the value of the real resource information; and
a responder to return, in response to the receiver receiving the acquisition request for the real resource information, a first response including the value of the real resource information acquired by the real resource information acquirer to a requester of the acquisition request, and to return, in response to the receiver receiving the acquisition request for the virtual resource information, a second response including the value of the virtual resource information acquired by the virtual resource information acquirer to the requester of the acquisition request, wherein
in a case where (i) the calculation uses values of multiple pieces of the real resource information, including the value of the real resource information from the device, and (ii) corresponding respective time points at which the values are collected, by the collector, from devices associated with the multiple pieces of the real resource information, including the device, fail to match each other, the real resource information acquirer causes the collector to collect the values again from the devices associated with the multiple pieces of the real resource information, and the time points failing to match each other refers to collection time points that are not equal to one another or within a predetermined time difference between the collection time points.

2. The management device according to claim 1, further comprising:
a setting requester to receive, from a first user, a setting request for setting a definition of the calculation.

3. The management device according to claim 2, wherein the definition of the calculation is at least one of a function or a script describing processing performed by the management device, and the function and the script include the value of the real resource information as an input.

4. The management device according to claim 2, further comprising:
a data model constructor to construct the data model based on an operation performed by the first user,
wherein the data model constructor includes a display to display the data model, and the setting requester.

5. The management device according to claim 1, wherein the virtual resource information acquirer causes the real resource information acquirer to acquire the value of the device associated with the real resource information included in the calculation.

6. The management device according to claim 1, wherein for the calculation using the values of multiple pieces of the real resource information, the virtual resource information acquirer causes the calculator to perform the calculation with the values of the multiple pieces of the real resource information collected by the collector from the devices at the corresponding respective time points matching one another to acquire the value of the virtual resource information.

7. The management device according to claim 1, further comprising:
an instructor to cause the real resource information acquirer to acquire the value of the real resource information in response to the receiver receiving, as the acquisition request, a first request for the real resource information, and to cause the virtual resource information acquirer to acquire the value of the virtual resource information in response to the receiver receiving, as the acquisition request, a second request for the virtual resource information.

8. The management device according to claim 1, further comprising:
a storage to store the value of the real resource information and the value of the virtual resource information,
wherein the real resource information acquirer causes the collector to collect the value from the device in predetermined cycles, and registers the collected value to the storage as the value of the real resource information,
in response to the value being collected in the predetermined cycles, the virtual resource information acquirer causes the calculator to perform the calculation with the collected value, and registers the calculation result of the calculation to the storage as the value of the virtual resource information, and in response to the receiver receiving the acquisition request for the real resource information, the responder returns a first response including the value of the real resource information for the acquisition request with reference to the storage, and in response to the receiver receiving the acquisition request for the virtual resource information, the responder returns a second response including the value of the virtual resource information for the acquisition request with reference to the storage.

9. The management device according to claim 1, further comprising:
an application device including:
an acquisition requester to receive the acquisition request from a second user, and transmit the acquisition request to the receiver, and
a data processor to process the value included in the response returned from the responder in response to the acquisition request.

10. The management device according to claim 1, further comprising:
the collector to collect the value from the device.

11. The management device according to claim 1, wherein the device includes a device managed by another management device different from the management device.

12. The management device according to claim 1, wherein the second response includes the value of the virtual resource information acquired by the virtual resource information acquirer and not the value of the real resource information acquired by the real resource information acquirer.

13. A management system, comprising:
a device connected to a network;
a data model constructor including:
a display to display a data model including real resource information associated with the device and virtual resource information associated with a calculation result of calculation performed using a value of the real resource information, and
a setting requester to receive a setting request for setting the calculation, the data model constructor being configured to construct the data model;
an application device including:
an acquisition requester to receive an acquisition request generated based on the data model to acquire the value of the real resource information or a value of the virtual resource information, and
a data processor to process a value included in a response returned in response to the acquisition request;
a receiver to receive the acquisition request from the acquisition requester;
a collector to collect a value from the device associated with the real resource information;
a calculator to perform the calculation to obtain the calculation result;
a real resource information acquirer to acquire the value of the real resource information by causing the collector to collect the value from the device associated with the real resource information;
a virtual resource information acquirer to acquire the value of the virtual resource information by causing the calculator to perform the calculation using the value of the real resource information; and a responder to return, in response to the receiver receiving the acquisition request for the real resource information, a first response including the value of the real resource information acquired by the real resource information acquirer to the application device, and to return, in response to the receiver receiving the acquisition request for the virtual resource information, a second response including the value of the virtual resource information acquired by the virtual resource information acquirer to the application device, wherein in a case where (i) the calculation uses values of multiple pieces of the real resource information, including the value of the real resource information from the device, and (ii) corresponding respective, time points at which the values are collected, by the collector, from devices associated with the multiple pieces of the real resource information, including the device, fail to match each other, the real resource information acquirer causes the collector to collect the values again from the devices associated with the multiple pieces of the real resource information, and the time points failing to match each other refers to collection time points that are not equal to one another or within a predetermined time difference between the collection time points.

14. The management system according to claim 13, wherein the setting request for setting the calculation includes a definition of the calculation, and the definition of the calculation is at least one of a function or a script describing processing performed by the management device, and the function and the script include the value of the real resource information as an input.

15. The management system according to claim 13, wherein the virtual resource information acquirer causes the real resource information acquirer to acquire the value of the device associated with the real resource information included in the calculation.

16. The management system according to claim 13, wherein for the calculation using the values of multiple pieces of the real resource information, the virtual resource information acquirer controls performance of the calculation with the values of the multiple pieces of the real resource information collected by the collector from the devices at the corresponding respective time points matching one another to acquire the value of the virtual resource information.

17. The management system according to claim 13, wherein the second response includes the value of the virtual resource information acquired by the virtual resource information acquirer and not the value of the real resource information acquired by the real resource information acquirer.

18. A non-transitory computer-readable recording medium storing a program for causing a computer for managing resource information values provided based on a data model that includes real resource information associated with a device connected to a network, and virtual resource information associated with a calculation result of calculation performed using a value of the real resource information to function as a receiver to receive an acquisition request generated based on the data model to acquire the value of the real resource information or a value of the virtual resource information, a real resource information acquirer to acquire the value of the real resource information by causing a collector to collect a value from the device associated with the real resource information, a virtual resource information acquirer to acquire the value of the virtual resource information by causing a calculator to perform the calculation using the value of the real resource information, and a responder to return, in response to the receiver receiving the acquisition request for the real resource information, a first response including the value of the real resource information acquired by the real resource information acquirer to a requester of the acquisition request, and to return, in response to the receiver receiving the acquisition request for the virtual resource information, a second response including the value of the virtual resource information acquired by the virtual resource information acquirer to the requester of the acquisition request, wherein in a case where (i) the calculation uses values of multiple pieces of the real resource information, including the value of the real resource information from the device, and (ii) corresponding respective time points at which the values are collected, by the collector, from devices associated with the multiple pieces of the real resource information, including the device, fail to match each other, the real resource information acquirer causes the collector to collect the values again from the devices associated with the multiple pieces of the real resource information, and the time points failing to match each other refers to collection time points that are not equal to one another or within a predetermined time difference between the collection time points.

19. The non-transitory computer-readable recording medium according to claim 18, wherein the program causes the computer to function as an application device including:
    an acquisition requester to receive the acquisition request from a second user, and transmit the acquisition request to the receiver, and
    a data processor to process the value included in the response returned from the responder in response to the acquisition request.

20. The non-transitory computer-readable recording medium according to claim 18, wherein the second response includes the value of the virtual resource information acquired by the virtual resource information acquirer and not the value of the real resource information acquired by the real resource information acquirer.

* * * * *